(12) United States Patent
Nelson

(10) Patent No.: US 10,082,362 B2
(45) Date of Patent: Sep. 25, 2018

(54) CONCEALED CARRY FIREARM ASSEMBLY, SYSTEM AND METHOD

(71) Applicant: Scott Nelson, Spring, TX (US)

(72) Inventor: Scott Nelson, Spring, TX (US)

(*) Notice: Subject to any disclaimer, the term of this patent is extended or adjusted under 35 U.S.C. 154(b) by 0 days.

(21) Appl. No.: 15/345,404

(22) Filed: Nov. 7, 2016

(65) Prior Publication Data

US 2017/0146314 A1 May 25, 2017

Related U.S. Application Data

(60) Provisional application No. 62/259,925, filed on Nov. 25, 2015.

(51) Int. Cl.
*F41C 9/02* (2006.01)
*H04B 1/3888* (2015.01)
*F41C 33/02* (2006.01)

(52) U.S. Cl.
CPC ............. *F41C 9/02* (2013.01); *H04B 1/3888* (2013.01); *F41C 33/0272* (2013.01)

(58) Field of Classification Search
CPC ...... F41C 9/00; F41C 9/02; F41C 9/04; F41H 9/10; H04B 1/3888; A45C 11/00
USPC ...... 42/1.09, 1.11, 52, 54, 96, 106; 224/240; 206/45.2
See application file for complete search history.

(56) References Cited

U.S. PATENT DOCUMENTS

| | | | |
|---|---|---|---|
| 4,113,157 A | 9/1978 | Woodbury | |
| 4,466,537 A | 8/1984 | McMahan | |
| 5,234,145 A | 8/1993 | Padin | |
| 5,584,424 A * | 12/1996 | Stava | A45F 3/00 224/240 |
| 5,611,164 A * | 3/1997 | Rassias | F41A 17/44 42/70.11 |
| 5,806,739 A | 9/1998 | Wood | |
| 5,967,393 A | 10/1999 | Clarke, III | |
| 7,434,427 B1 | 10/2008 | Miresmaili | |
| 7,478,724 B2 * | 1/2009 | Vor Keller | F41A 17/02 206/317 |
| 7,934,333 B1 * | 5/2011 | Tuz | F41C 9/02 42/96 |
| 8,104,313 B2 | 1/2012 | Wolfe | |
| 8,302,827 B1 * | 11/2012 | Cole | F41C 9/02 224/243 |
| 8,328,058 B2 | 12/2012 | Wilson | |
| 8,622,269 B2 | 1/2014 | Hogue | |
| 9,103,627 B1 | 8/2015 | Campbell | |
| 9,500,441 B2 * | 11/2016 | Kirby, Jr. | F41C 33/06 |
| 9,530,266 B2 * | 12/2016 | Delattre | E05G 1/005 |
| 9,638,496 B2 * | 5/2017 | Peters | F41H 5/0478 |
| 9,803,956 B2 * | 10/2017 | Ellingson | A45C 11/24 |
| 9,982,968 B2 * | 5/2018 | Thomas | F41H 5/08 |

(Continued)

*Primary Examiner* — John Cooper
(74) *Attorney, Agent, or Firm* — Buche & Associates, P.C.; John K. Buche; Scott D. Compton

(57) ABSTRACT

The application is directed to a mobile firearm concealment system including a housing for concealing a corresponding firearm therein. The housing may include an outer appearance, shape and size of a mobile electronic device. The housing may also include an inner surface operationally configured to hold the firearm in a concealed position within the housing and to also direct the firearm to a non-concealed position. The housing and firearm may also cooperate in a manner effective to dictate the non-concealed position of the firearm.

5 Claims, 19 Drawing Sheets

(56) References Cited

U.S. PATENT DOCUMENTS

| | | | |
|---|---|---|---|
| 2001/0048009 A1* | 12/2001 | Vor Keller | F41A 17/066 |
| | | | 224/244 |
| 2002/0158095 A1* | 10/2002 | Vor Keller | E05B 47/0603 |
| | | | 224/244 |
| 2004/0163913 A1* | 8/2004 | Tschudy | A45C 5/06 |
| | | | 190/111 |
| 2004/0217141 A1 | 11/2004 | Brooks | |
| 2005/0224537 A1* | 10/2005 | Rassias | F41A 17/02 |
| | | | 224/243 |
| 2008/0047860 A1* | 2/2008 | Shane | F41A 17/02 |
| | | | 206/317 |
| 2010/0243492 A1 | 9/2010 | Bulthuis, Jr. | |
| 2014/0027479 A1 | 1/2014 | Hogue | |
| 2014/0158734 A1 | 6/2014 | Bickert | |
| 2015/0041513 A1 | 2/2015 | Hawks, Jr. | |
| 2015/0233671 A1 | 8/2015 | Schmadeka | |
| 2017/0045329 A1* | 2/2017 | Turnington | F41C 9/02 |
| 2017/0205186 A1* | 7/2017 | Kjellberg | F41C 9/02 |

\* cited by examiner

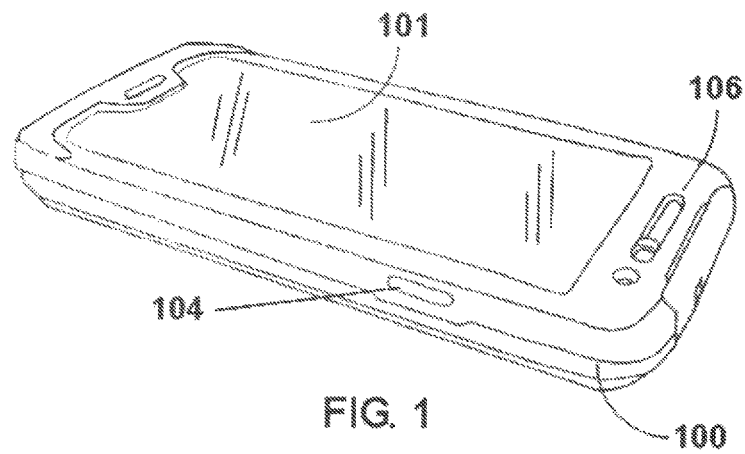
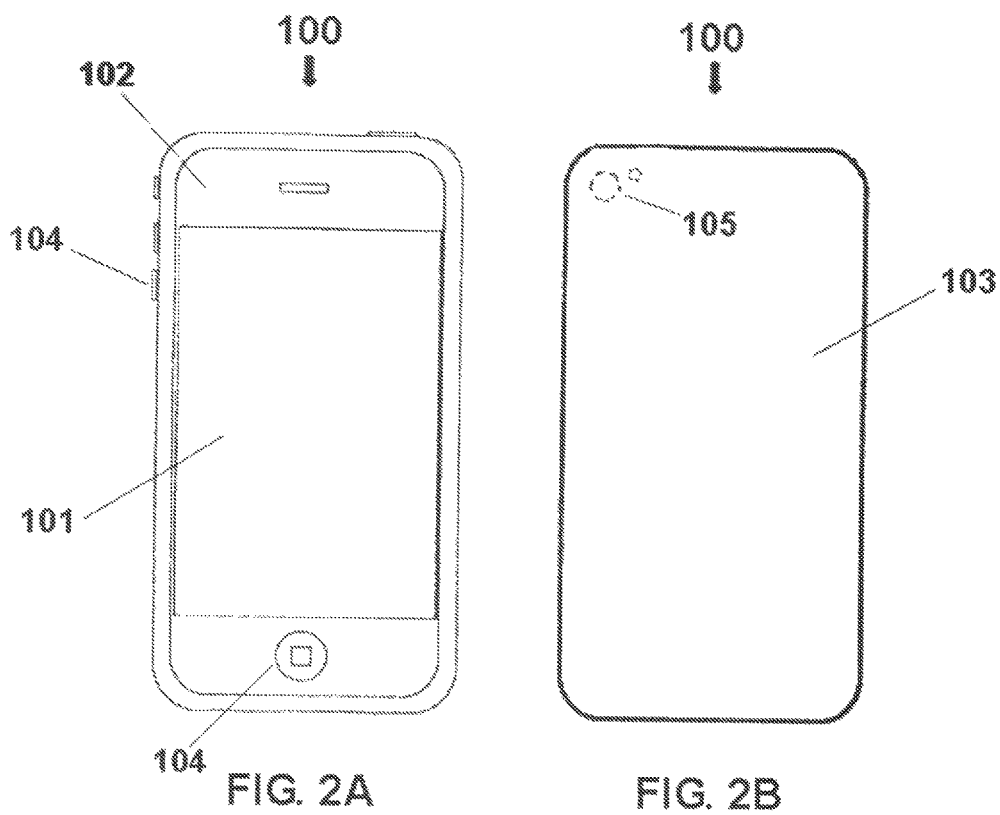

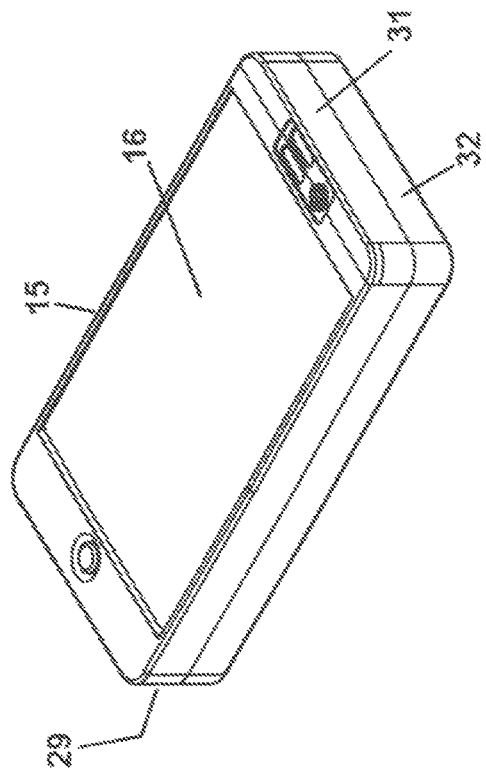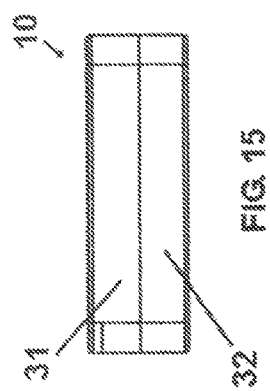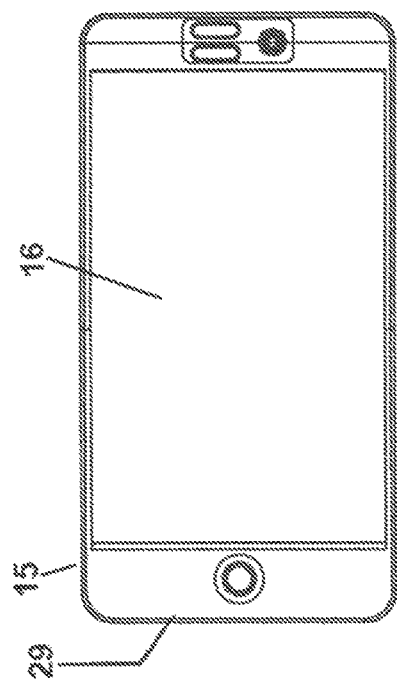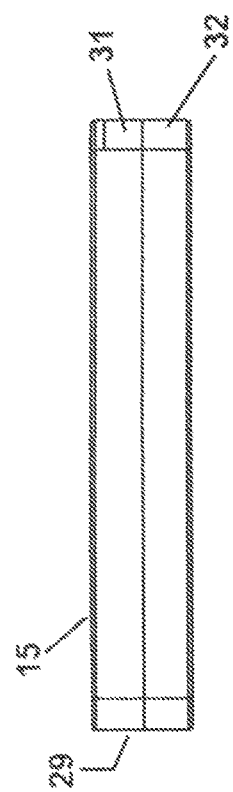

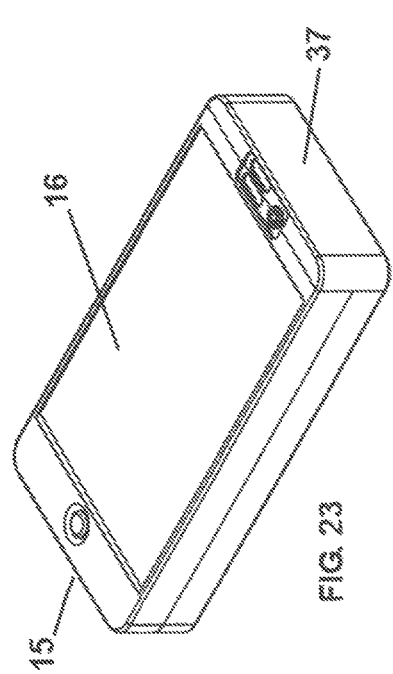
FIG. 23
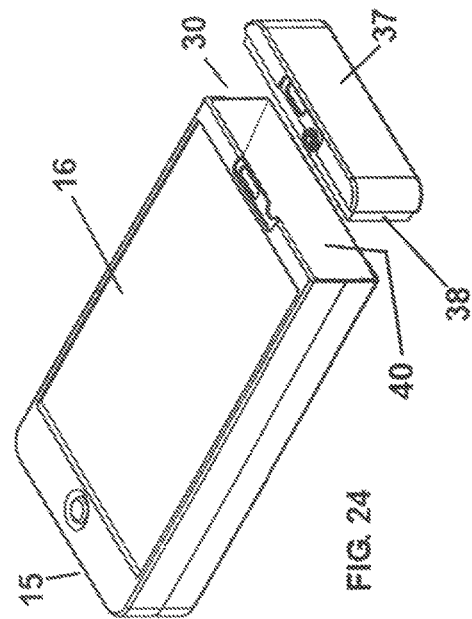
FIG. 24
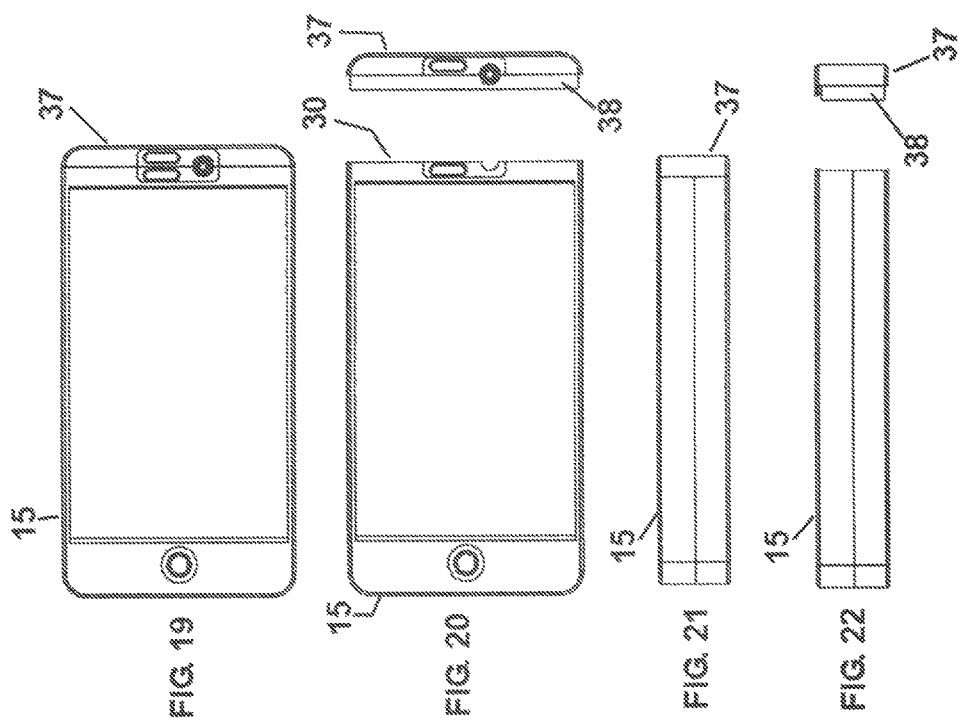
FIG. 19
FIG. 20
FIG. 21
FIG. 22

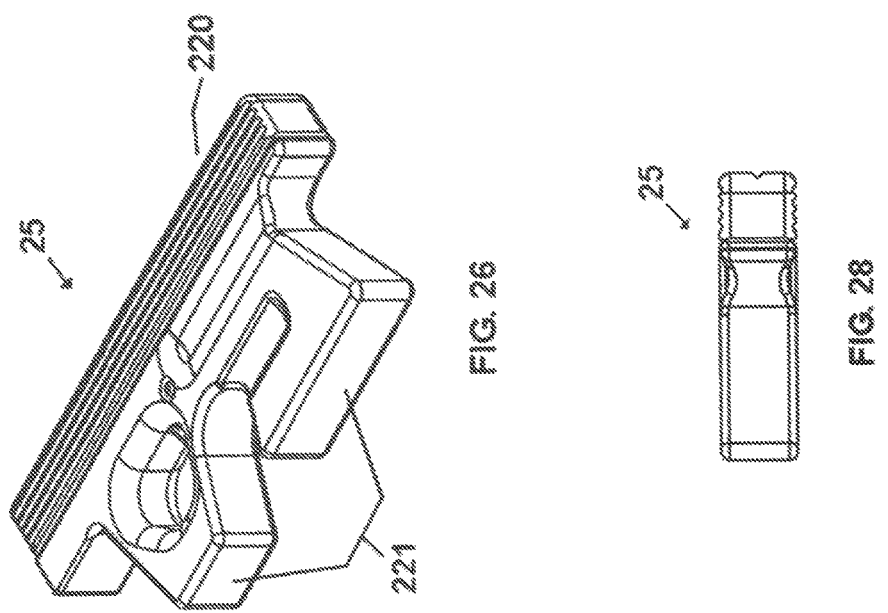
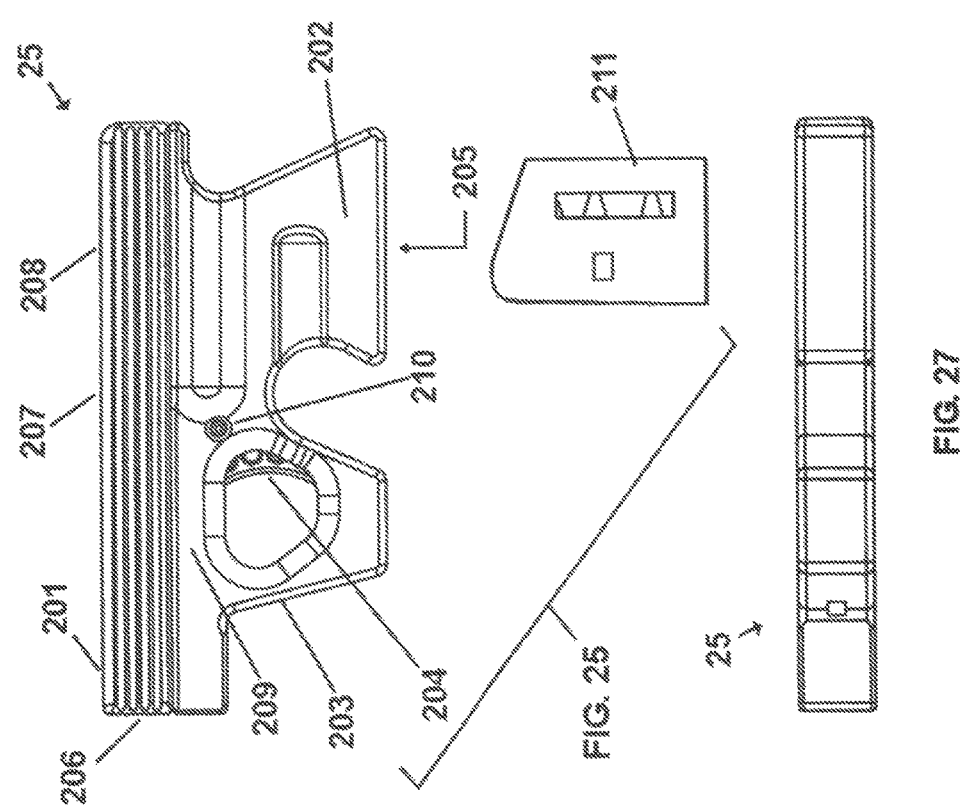

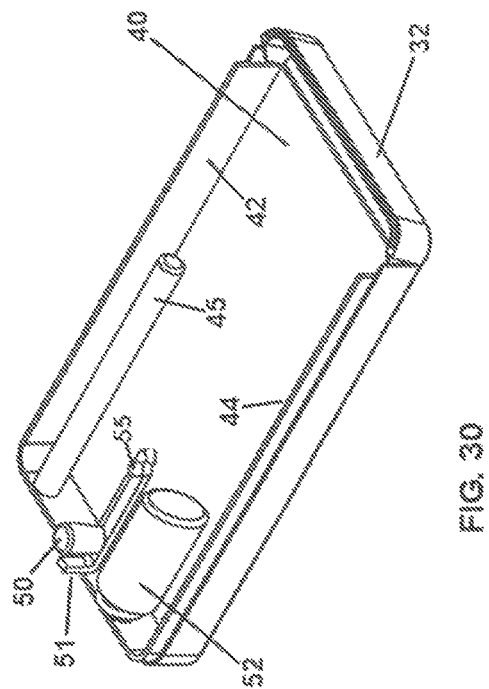
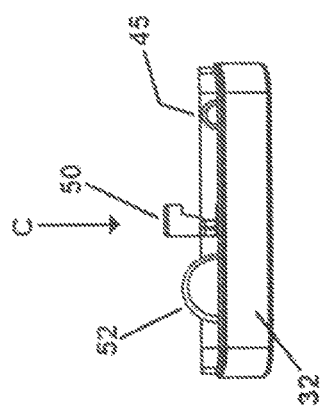
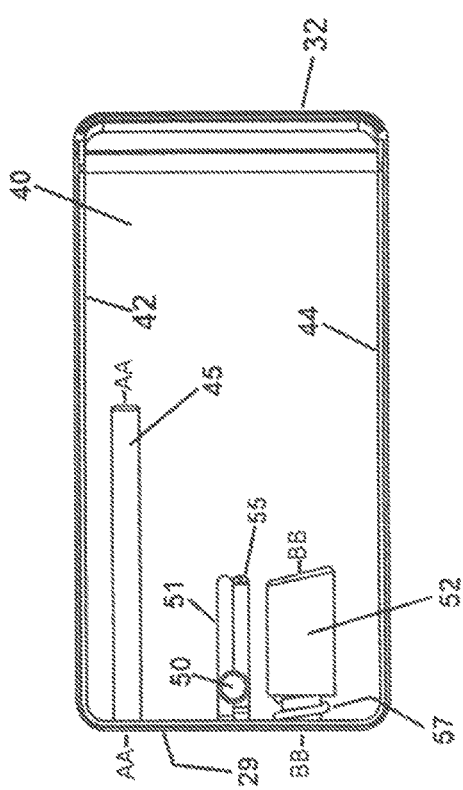
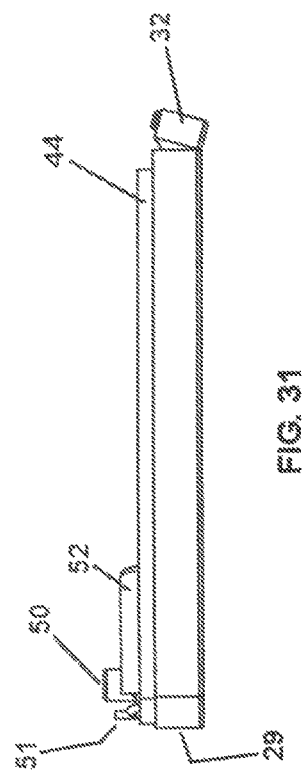
FIG. 30
FIG. 32
FIG. 29
FIG. 31

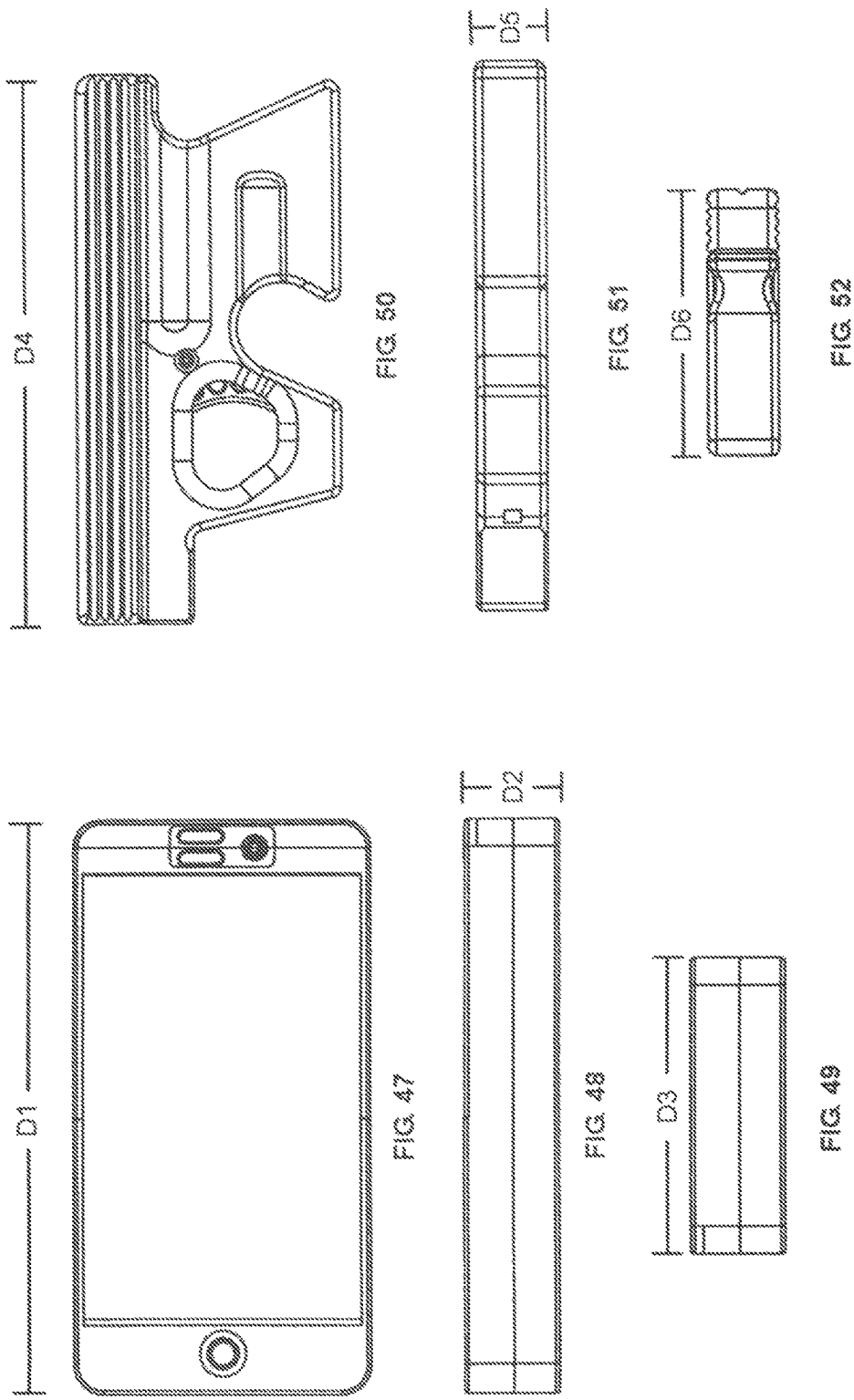

CONCEALED CARRY FIREARM ASSEMBLY, SYSTEM AND METHOD

CROSS-REFERENCE TO RELATED APPLICATIONS

The application is entitled to the benefit of the filing date of the prior filed provisional application No. 62/259,925, filed on Nov. 25, 2015.

STATEMENT REGARDING FEDERALLY SPONSORED RESEARCH OR DEVELOPMENT

Not applicable.

FIELD OF THE APPLICATION

The application relates generally to the concealment of a firearm on a person.

BACKGROUND

Concealed carry handgun laws typically require carrying a firearm without brandishing the firearm. The most common ways of carrying a concealed firearm have included using hip holsters, crossdraw holsters, shoulder holsters, ankle holsters and boot clips, all of which are suitably concealed by a user's clothing and/or apparel. Other persons simply place a firearm in his/her pocket, purse or wallet. With the advent of mobile electronic devices such as tablet computers and smart phones, attempts have been made to incorporate the concealment of firearms using this new technology. Unfortunately, such attempts include using objects having the appearance of mobile electronic devices as a facade for known firearms and holsters, which results in bulky concealment devices and/or devices that hinder speedy access to the firearm for use. There is a need to overcome these shortcomings.

SUMMARY OF THE APPLICATION

The present application is directed to a concealed carry firearm system for a user including a firearm and housing cooperatively operationally configured to hold the firearm in a concealed position within the housing and to direct the firearm to a non-concealed position via user control. The present application is also directed to a concealed carry firearm system including (1) a firearm and (2) a housing having an outer surface appearance of a mobile electronic device; the firearm and housing are cooperatively operationally configured to hold the firearm in a concealed position and hold the firearm in a non-concealed position.

The present application is also directed to a concealed carry firearm system including a firearm and a housing for receiving a firearm therein, the housing having an ejection assembly operationally configured to engage a firearm at a concealed position of the firearm, disengage the firearm and direct the firearm to a non-concealed position. The present application is also directed to a concealed carry firearm system including (a) a firearm having a biased catch assembly defined by a cavity in the body of the firearm and biased ball member located within the cavity; and (b) a housing having (1) an inner surface configuration operationally configured to communicate with the biased catch assembly and (2) an ejection assembly operationally configured to hold the firearm in a concealed position and operationally configured to direct the firearm to a non-concealed position.

BRIEF DESCRIPTION OF THE SEVERAL VIEWS OF THE DRAWING

FIG. 1 is a perspective view of an exemplary housing of the application including an outer appearance of a protective case—smart phone combination.

FIG. 2A is a front view of an exemplary housing of the application.

FIG. 2B is a back view of the housing of FIG. 2A.

FIG. 12 is a front view of an exemplary housing of the present application including opposing flap members in a closed position.

FIG. 13 is a perspective view of the housing of FIG. 12.

FIG. 14 is an elevational side view of the housing of FIG. 14.

FIG. 15 is a view of a second end of the housing of FIG. 12.

FIG. 19 is a front view of another embodiment of a housing with an end cap covering the opening to the interior of the housing.

FIG. 20 is another front view of the housing of FIG. 19 with the end cap removed from the housing.

FIG. 21 is an elevational side view of the housing of FIG. 19.

FIG. 22 is an elevational side view of the housing as shown in FIG. 20.

FIG. 23 is a perspective view of the housing of FIG. 19.

FIG. 24 is a perspective view of the housing as shown in FIG. 20.

FIG. 25 is an elevational side view of an exemplary embodiment of a firearm of the application.

FIG. 26 is a perspective view of the firearm of FIG. 25.

FIG. 27 is a bottom view of the firearm of FIG. 26.

FIG. 28 is a back view of the firearm of FIG. 26.

FIG. 29 is a front view of the interior of an embodiment of a housing of this application.

FIG. 30 is a perspective view of the housing of FIG. 29.

FIG. 31 is an elevational side view of the housing of FIG. 29.

FIG. 32 is a view of a second end of the housing of FIG. 29.

FIG. 47 is a front view of an embodiment of a housing of the present application.

FIG. 48 is an elevational side view of the housing of FIG. 47.

FIG. 49 is an elevational view of the second end of the housing of FIG. 47.

FIG. 50 is a side view of an exemplary firearm for use with the housing of FIG. 47.

FIG. 51 is a bottom view of the firearm of FIG. 50.

FIG. 52 is a back view of the firearm of FIG. 50.

DETAILED DESCRIPTION

Figure 3:
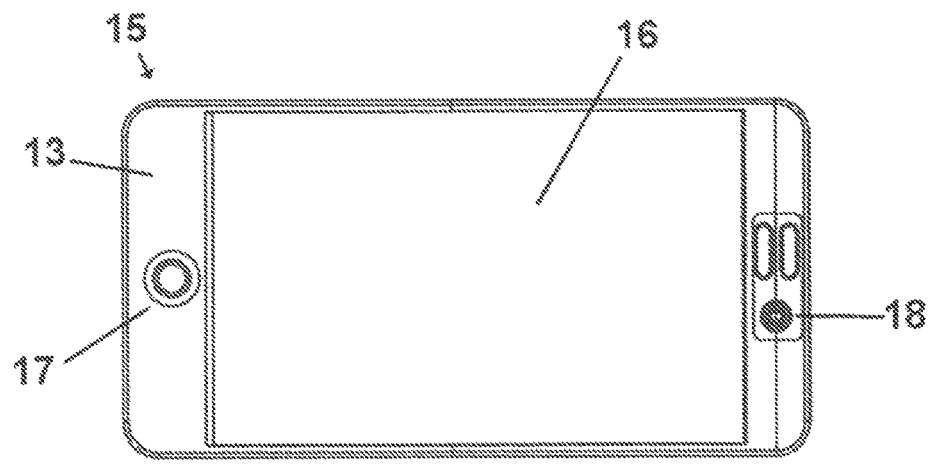
FIG. 3 is a front view of an exemplary housing of the present application including opposing flap members in a closed position.
Figure 4:
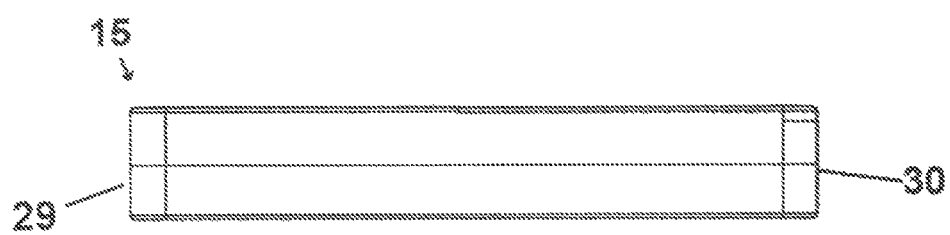
FIG. 4 is an elevational side view of the housing of FIG. 3.
Figure 5:
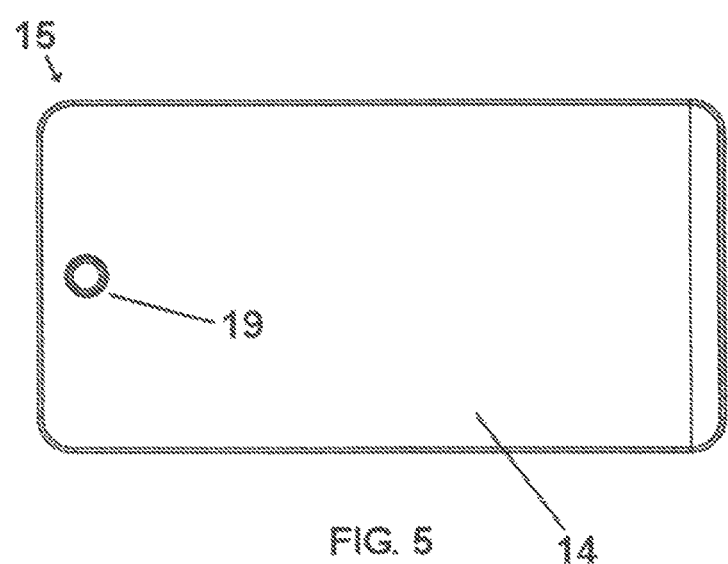
FIG. 5 is a back view of the housing of FIG. 3.
Figure 6:
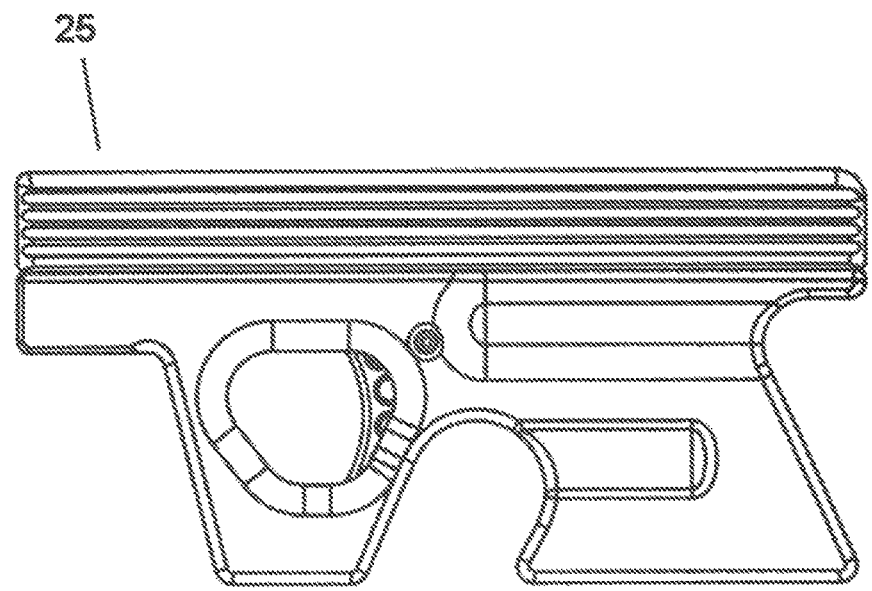
FIG. 6 is an elevational side view of an exemplary firearm of the present application.
Figure 7:
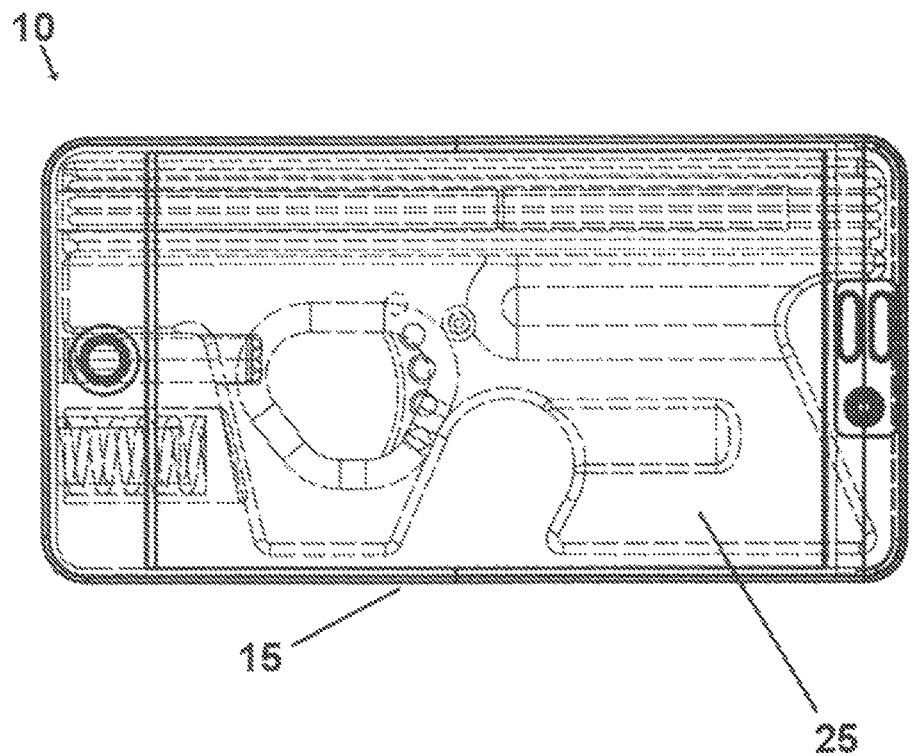
FIG. 7 is a phantom view of an embodiment of a system of the present application including a firearm in a concealed position within a housing.

Before describing the invention in detail, it is to be understood that the present assembly, system and method are not limited to particular embodiments. It is also to be understood that the terminology used herein is for the purpose of describing particular embodiments only, and is not intended to be limiting. As used in this application, the terms "brandish," "brandishing" and the like mean to display, show, wave, or exhibit a firearm in public or in a public place in a manner that is against applicable law and/or in a manner that another person might find threatening. Herein, "use" of a firearm may include brandishing the firearm, pointing the firearm at a target, firing or shooting the firearm, and combinations thereof. When referring to a firearm being in a "concealed" position, such term means that the firearm is hidden from view by way of storage within a housing of this invention. When referring to a firearm being in a "non-concealed" position, such term means that the firearm is at least partially exposed out from a corresponding housing. When referring to the present invention as having a housing with an outer appearance resembling a mobile electronic device, such description suitably includes a rectangular box type configuration with a front, back, opposing ends and opposing sides, with one or more electronic features, e.g., touch screen, push button, plugs, ports, camera lens, microphone, speaker, and a size and shape of the mobile electronic device being mimicked, e.g., a smart phone, a tablet.

In one aspect, the application provides a firearm concealment system including a housing for concealing a corresponding firearm. Suitably, the housing has an outer appearance, shape and size of a mobile electronic device and an inner surface cooperatively operationally configured with the outer surface of the firearm in a manner effective to receive the firearm therein in a concealed position and to also hold the firearm in a non-concealed position. The system may be operationally configured for right handed use, left handed use or both.

In another aspect, the application provides a firearm concealment system including a housing assembly operationally configured to receive a corresponding firearm in a concealment position therein and operationally configured to direct the firearm to a non-concealment position for access to the firearm by a user. The housing suitably includes one or more safety features effective to prevent undesired non-concealment of the corresponding firearm.

In another aspect, the application provides a housing for concealing a firearm providing unencumbered easy and quick access to the firearm as desired, the housing having an outer appearance resembling a mobile electronic device.

In another aspect, the application provides a firearm and housing for concealment of the firearm, the housing having an inner surface configuration corresponding to the outer surface configuration of the firearm.

In another aspect, the application provides a portable firearm concealment system including a housing for storing a firearm in a concealed manner, the housing having an ejection assembly operationally configured to hold a firearm in the housing in a fixed concealed position and for directing the firearm to a non-concealed position whereby at least part of the firearm extends out from the housing once the ejection assembly is activated. The housing has an outer appearance of a mobile electronic device and may be carried in a manner similar as the mobile electronic device it is designed to emulate. For example, the housing, with firearm concealed therein, may be carried by hand, stored in a clothes pocket, stored in a carrier such as a handbag, satchel and the like, carried at a user's hip or waist via the inclusion of a waist attachment member including, but necessary limited to hook and loop fasteners, a waistband and/or a belt attachment such as a belt loop, holster, clip, or the like as understood by the skilled artisan, and combinations thereof. The housing may also be attached to a chain, rope, cord or strap to worn around the neck or over a user's shoulder, or otherwise carried in any manner similar to known mobile electronic devices. Because the housing has the appearance of a mobile electronic device, the present invention may be carried in plain sight without having to conceal or otherwise cover the housing from sight via clothing or another object. As desired, the housing may be carried apart from a user's skin and/or clothing, which may increase ease of access to a non-concealed firearm and prevent corrosion or other weathering of a firearm due to contact with a user's body fluids including, but necessarily limited to sweat.

In another aspect, the application provides a portable firearm concealment system including an outer housing operationally configured to conceal a firearm therein. The outer housing may be carried at a user's hip or waist via a clip or similar device or assembly as described, for example, in U.S. Pat. No. 9,326,587, granted May 3, 2016, herein incorporated by reference in its entirety; U.S. Pat. No. 7,832,606, granted Nov. 16, 2010, herein incorporated by reference in its entirety; U.S. Pat. No. 8,604,753, granted Nov. 10, 2013, herein incorporated by reference in its entirety.

In another aspect, the application provides a portable firearm concealment system including a housing operationally configured for use with a known commercially available firearm, the housing having an inner surface design corresponding to the outer surface configuration of the firearm allowing the firearm to be concealed within the housing and released from the housing for use as desired.

In another aspect, the application provides a portable firearm concealment system including a housing operationally configured to conceal a firearm and operationally configured to be opened to expose the firearm to the user for ease of access and use.

Suitably, the present invention comprises novel technology for the concealed carry of a firearm including an outer housing operationally configured to conceal a firearm therein and act on the firearm in a manner effective to expose at least part of the firearm in a non-concealed manner out from the housing. To better understand the novelty of the invention, reference is hereafter made to the accompanying drawings.

With reference to FIGS. 1, 2A and 2B, for purposes of camouflaging and/or non-brandishing of firearms in public places and according to one or more applicable laws concerning the concealed carry of firearms, one exemplary embodiment of an outer housing of this application suitably conveys the appearance of a smart phone or a combination of a protective case and smart phone ("case/phone combination") as understood by persons of ordinary skill in the art. In this embodiment, a suitable housing may be characterized by a rectangular type protective outer case 100, a smart phone touch screen 101 surface disposed along the front side 102 of the housing and a substantially solid back side 103 as is common with protective cases for mobile electronic devices. As desired, the protective outer case 100 may also include one or more input/output appearing features commonly found on protective case type products, e.g., push buttons 104, a camera lens 105, a microphone and/or speaker 106. It is also contemplated that a particular housing embody an outer surface configuration emulating the look and appearance of a particular brand of commercially available protective case corresponding to a certain brand and type of commercially available smart phone in an attempt to enhance the camouflaging effect of the invention. It is further contemplated that the housing of this application may include one or more novel outer surface configurations as desired.

Turning to the simplified embodiment as illustrated in FIGS. 3-7, in one aspect the invention may comprise a system including a housing, also referred to herein as an outer case assembly or "outer case" 15, and a corresponding firearm 25 effective to be inserted within the outer case 15 in a concealed manner and also effective to be withdrawn from the outer case 15 as desired. As shown, the front side 13 and the back side 14 of the outer case 15 may include one or more features as described above. For example, the front side 13 may include what may appear to an ordinary observer as a touch screen 16, a manual push button 17, a microphone 18 and a camera lens 19. In this embodiment, the outer case 15 suitably includes a closed first end 29 and a second end defined by a closeable opening 30 or outlet for the firearm 25, although it is contemplated that an opening may be disposed along a side of the outer case 15 rather than at an end of the outer case 15. In one embodiment, the touch screen 16 may be provided as a substantially black glossy surface similar as a touch screen of an electronic mobile device in an OFF position or SLEEP position. In another embodiment, the touch screen 16 may include what appears to be one or more program or function icons disposed across the touch screen 16 similar as an electronic mobile device set at an ON position. In another embodiment, the outer case 15 may be provided as a single piece manufacture. In another embodiment, the outer case 15 may be provided in multiple parts or sections for assembly/disassembly. For example, one suitable outer case 15 may include a front side member and a back side member similar as outer protective cases for mobile electronic devices that may be snap-fit together or adhered together for permanent attachment.

With attention to FIGS. 8-15, the opening 30 of the outer case 15 may be provided with a dual flap type cover assembly including opposing flap members 31, 32 moveable between an open position (see FIGS. 8-11) and a closed position (see FIGS. 12-15). The flap members 31, 32 may be attached to the outer case 15 as desired. In one embodiment, the flap members 31, 32 may be attached to the outer case 15 in a biased manner enabling the flap members 31, 32 to rest in a closed position as shown in FIGS. 12-15 (1) until a firearm 25 is ejected out from the outer case 15 whereby the flap members 31, 32 are forced open by the firearm 25 or (2) until the flap members 31, 32 are manually opened, e.g., when inserting a firearm 25 into the outer case 15 for concealment purposes. In another embodiment, the flap members 31, 32 may be attached to the outer case 15 via elongated spring-biased hinges or the equivalent. In another embodiment, the flap members 31, 32 may be attached to the outer case 15 via a series of spring biased strap hinges, swing door fittings, and combinations thereof. In one particular embodiment, the flap members 31, 32 may be attached to the outer case 15 via elongated spring-biased piano hinges. In still another embodiment, the non-biased flap members 31, 32 may be hingedly attached to the outer case 15 and held in a closed position via one or more snap fittings, releasable locks, or via a tight flush fitting with the coverable opening 30 of the outer case 15. In another embodiment, the flap members 31, 32 may be fixed in a closed position against the outer case 15 via magnetism, e.g., one or more magnets disposed along the flap members 31, 32 corresponding with metal inlays along outer case 15 or vice versa.

In still another embodiment, the flap members 31, 32 may be double biased in either direction. For example, if a flap member is less than about half-way open, the flap member may be urged to a closed position. Likewise, if the flap member is more than about half-way open, the flap member may be suitably urged toward an open position. Regardless the mechanism employed, the flap members 31, 32 of FIGS. 8-15 are suitably constructed from one or more rigid type materials effective for opening and closing as described above.

Figure 16:
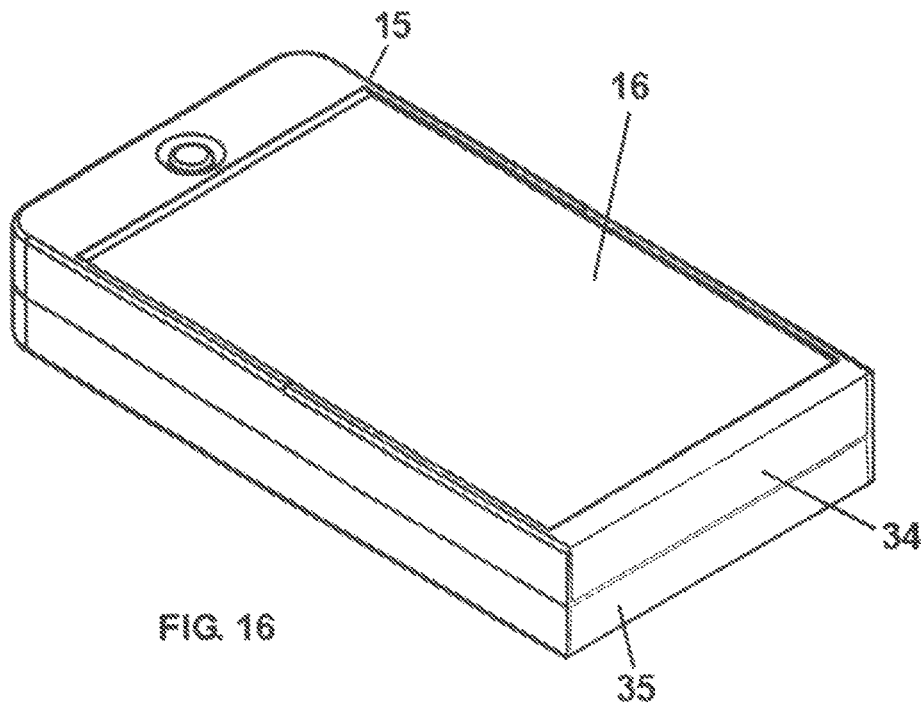
FIG. 16 is a perspective view of another embodiment of a housing of this application.
Figure 17:
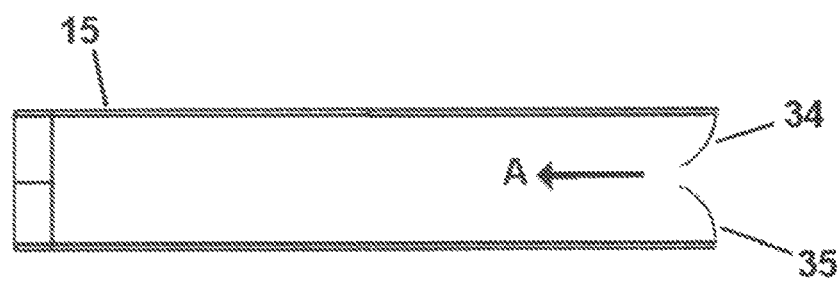
FIG. 17 is an elevational side view of the housing of FIG. 16 including flexible members in an inward position.
Figure 18:
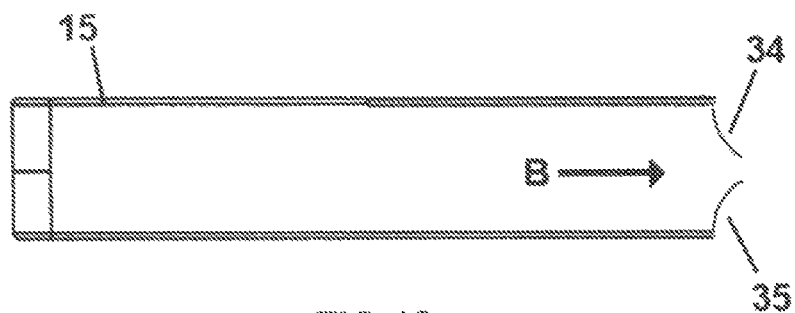
FIG. 18 is another elevational side view of the housing of FIG. 16 including flexible members in an outward position.

In still another embodiment as illustrated in FIGS. 16-18, the coverable opening 30 may include one or more flexible members 34, 35 fixed to the outer case 15 in a non-hinged arrangement whereby the one or more flexible members 34, 35 are operationally configured to flex inward and outward (see Directional Arrows A and B) as a firearm 25 passes there between in either direction. In one suitable embodiment, the one or more flexible members 34, 35 as shown in FIGS. 16-18 may be constructed from rubber, leather, and combinations thereof. Suitable rubbers may include, but are not necessarily limited to silicon rubber, neoprene, butyl rubber, and combinations thereof.

In still another embodiment as illustrated in FIGS. 19-24, the opening 30 of the outer case 15 may include a removable cap 37 type member operationally configured to (1) conceal a firearm 25 housed within the outer case 15 from view when the removable cap 37 is mated to the coverable opening 30 and (2) expose the inner surface 40 of the outer case 15, and firearm 25 housed therein, when the removable cap 37 is separated apart from the outer case 15. The cap 37 may be secured to the outer case 15 as desired, suitably, in a manner effective to retain the cap 37 in a mated position with the coverable opening 30 during system 10 operation. As understood by the skilled artisan, the cap 37 may include a rim 38 with an outer surface operationally configured to mate flush with the perimeter of the inner surface of the coverable opening 30 in a slip-on manner.

One advantageous feature of the present system 10 involves providing an outer case 15 having an inner surface 40 configuration for use with a particular firearm 25. For example, the system 10 may employ an inner surface 40 configured to receive a novel firearm characterized by distinct ornamental surface features. In such embodiment, the outer case 15 is intended for operation solely with the corresponding firearm 25. In another embodiment, the outer case 15 may include an inner surface 40 operationally configured to provide a suitable system 10 for operation with a known commercially available firearm 25. In still another embodiment, the outer case 15 may include an inner surface 40 operationally configured to work with a plurality of known commercially available firearms 25. The first variation of the system 10 described in this paragraph may be referred to herein as an "Original Model" of the system 10 and the latter two variations of the system 10 may be referred to as "Custom Models" of the system 10. As such, an Original Model may include a firearm 25 size and shape as desired or as otherwise required. As understood by the skilled artisan, the size and shape of the firearm 25 of the system 10 dictates the size of the outer case 15.

Turning to FIGS. 25-28, in one simplified embodiment of an Original Model a firearm 25 of the system 10 suitably includes an overall length, height and width allowing the outer case 15 to be provided in a size and shape substantially similar to a commercially available case/phone combination. In one exemplary embodiment, a suitable outer case 15 may include the following dimensions: 14.34×7.05×1.83 cm (5.65×2.78×0.72 inches)—with a screen-to-body ratio of about 70.0 percent. Therefore, the firearm 25 of an Original Model suitably includes a width less than typical commercially available semi-automatic pistols, which may range in width from about 2.03 cm to about 3.81 cm (about 0.8 inch to about 1.5 inches). With particular attention to FIG. 25, an Original Model type firearm 25 of this application may include a hammer or a hammerless design as shown and may include various parts common to commercially available semi-automatic pistols including, but not necessarily limited to a barrel 201, grip 202, trigger guard 203, trigger 204, a magazine 211 for housing within a magazine well 205 within the grip 202, muzzle 206, chamber 207, slide 208 and an ejection port there under and exposed as the slide 208 moves rearward, frame 209 and magazine release 210. As desired, the firearm 25 may include one or more other features common to firearms including, but not necessarily limited to a hammer, front sight, rear sight, a take-down lever, safety and slide release. One suitable Original Model firearm 25 for use herein may include a semiautomatic pistol type of firearm including, but not necessarily limited to features as described in U.S. Pat. No. 4,409,882, granted Oct. 18, 1983, herein incorporated by reference in its entirety.

With reference now to FIGS. 29-32, for effective storage and ejection of a firearm 25 out from the outer case 15, the outer case 15 suitably includes an inner surface 40 configuration for optimizing linear movement and minimizing lateral movement of the firearm 25 therein. The outer case 15 also suitably includes an ejection assembly for holding a firearm 25 in a fixed position within the outer case 15 that may be manually operated to eject the firearm 25 as desired. As shown, the inner surface 40 may include an upper surface 42 for engaging the upper surface 220 of a firearm 25 and a bottom surface 44 for engaging a bottom surface 221 of a firearm 25. As shown in FIGS. 25 and 26, the bottom surface 221 of the firearm 25 may include both the bottom surfaces of the grip 202 and the trigger guard 203. In another embodiment, the bottom surface 221 may be defined by either the bottom surface of the grip 202 or the trigger guard 203. Suitably, the upper surface 220 and bottom surface 221 of a firearm 25 abut surfaces 42, 44 in a slidable manner.

The outer case 15 may also include an elongated guide member 45 defined by a longitudinal axis AA extending out from the inner surface of the closed end 29 of the outer case 15 that is operationally configured to mate with the firearm 25. As shown, the guide member 45 is suitably located within the outer case 15 in a manner effective to mate with the muzzle 206 and barrel 201 and promote linear movement of the firearm 25 directionally during operation. As understood by the skilled artisan, the guide member 45 may include a length up to the internal length of the barrel 201. As shown, the guide member 45 may include a cylindrical outer surface for abutting the inner surface of the barrel 201. In another embodiment, the guide member 45 may include a width or diameter less than the diameter of the muzzle 206. The guide member 45 may also be provided as a multi-sided member as desired. In addition, the guide member 45 may be provided as a formed part of the outer case 15. In another embodiment, the guide member 45 may be provided as a removable member, e.g., a snap-fit with the inner surface of the closed end 29 or a screw on fit with the inner surface of the closed end 29. In still another embodiment, the guide member 45 may be adhered to the inner surface of the closed end 29 with one or more adhesives.

Figure 33:
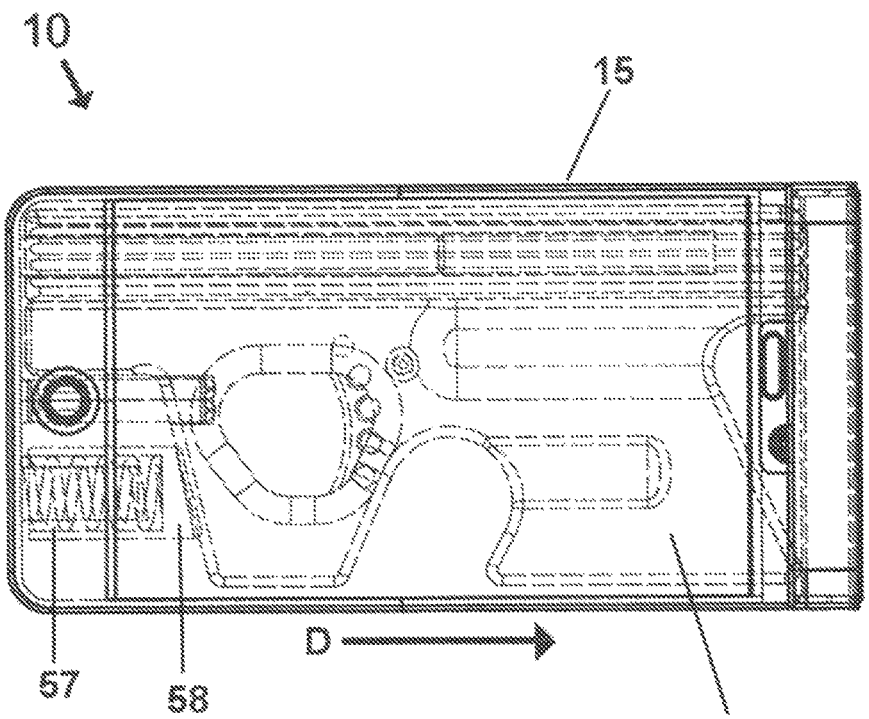
FIG. 33 is a phantom view of an embodiment of the system including a firearm in a concealed position within a housing.
Figure 34:
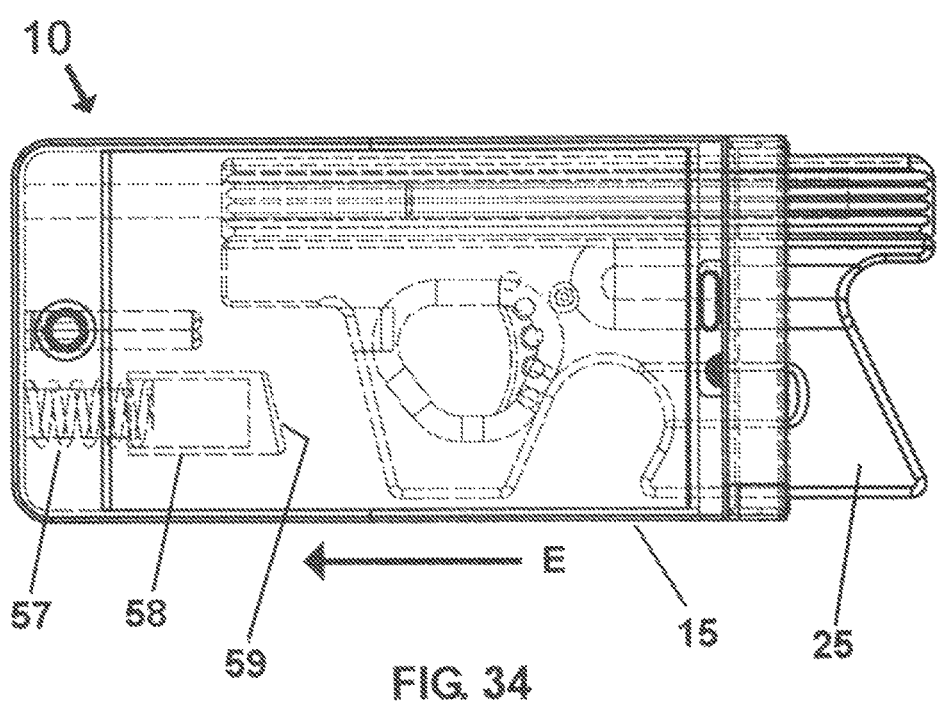
FIG. 34 is a partial phantom view of the system of FIG. 33 including the firearm in a non-concealed position.
Figure 35:
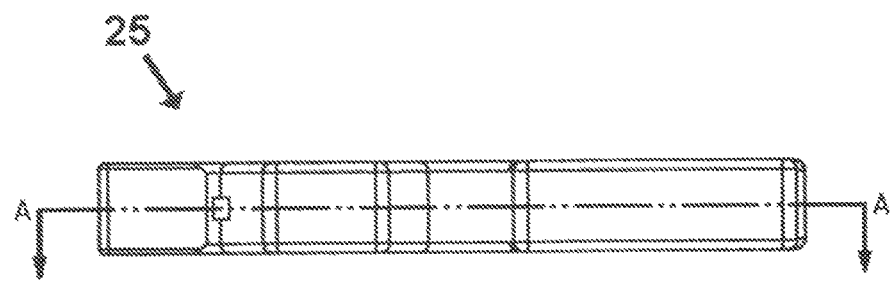
FIG. 35 is a bottom view of an embodiment of a firearm of the present application.

Still referring to FIGS. 29-32, the system 10 suitably includes a firearm ejection system defined in part by a housing having an ejection assembly including a biased catch system effective to hold the firearm 25 in a fixed concealed position within the outer case 15 (see FIG. 33) and to direct the firearm 25 to a non-concealed position (see FIG. 34). In one suitable embodiment, the ejection assembly may include a (1) release member 50, (2) a catch member 51 in communication with the release member 50 and (3) a linearly biased ejection member 52 defined by a longitudinal axis BB that extends out from the inner surface of the closed end 29 of the outer case 15. Suitably, the release member 50 and catch member 51 are provided as an assembly including an L-shaped catch member 51 pivotally attached to the inner surface of the closed end 29 with the release member 50 attached to the pivotal body of the catch member 51 as shown. The release member 50 may suitably operate similar as a push button so that when the release member 50 is activated, i.e., worked directionally according to Directional Arrow C (see FIG. 32), the release member 50 acts on the body of the catch member 51 to pivot the catch member 51 toward the inner surface 40 to remove or disengage the catch member 51 apart from the firearm 25. As such, the release member 50 may have a surface appearance of a push button, or other electronic features, as typically found on a mobile electronic device.

Figure 36:
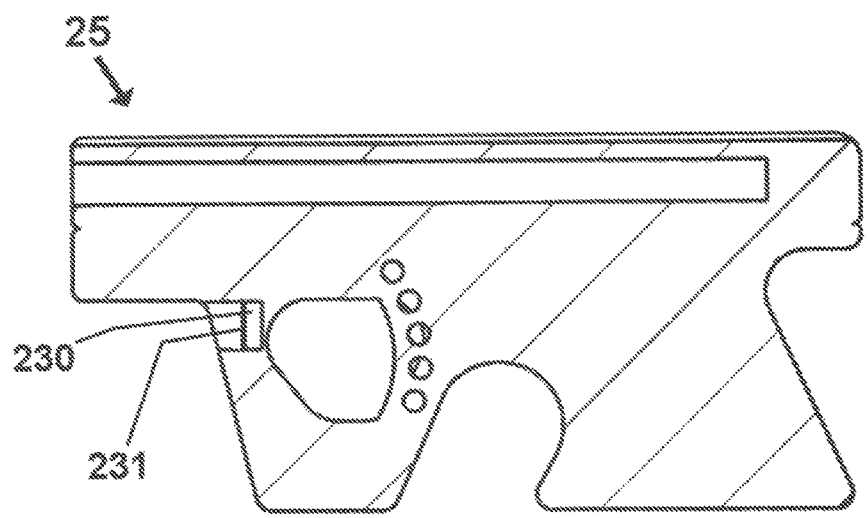
FIG. 36 is a sectional side view, Section A-A, of the firearm of FIG. 35.
Figure 37:
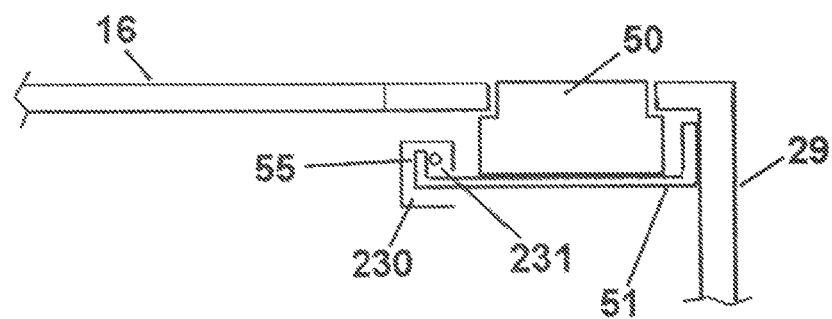
FIG. 37 is a simplified illustration of operable features of an ejection assembly and corresponding parts of a firearm shown in FIG. 36.

With particular reference to FIG. 30, the catch member 51 may include a raised distal end 55 operationally configured to grab or otherwise engage a surface or surface portion of the corresponding firearm 25 in a manner to prevent linear movement of the firearm toward the opening 30 when the firearm 25 is set at a concealed position within the outer case 15. In one embodiment, the catch member 51 may engage a surface of the trigger guard 203 and/or trigger 204 of a corresponding firearm 25, e.g., the distal end 55 of the catch member 51. As shown in FIG. 36, the ejection system may also include a firearm 25 provided with a cavity 230 including a catch surface 231 operationally configured to receive the distal end 55 of the catch member 51 in an abutment position or engagement in a manner effective to prevent linear movement of the firearm toward the opening 30 when the firearm is concealed within the outer case 15. As understood by persons of ordinary skill in the art, the cavity 230 provides sufficient space effective for the catch member 51 to pivot therein so that the distal end 55 may be directed between a first engagement position overlapping the catch surface 231 (see FIG. 37) and a second non-engagement position clear of the catch surface 231. Without limiting the catch member 51 to a particular material of construction, suitable construction materials include flexible materials and/or semi-flexible materials including, but not necessarily limited to metals, plastics, composite materials, and combinations thereof. In one suitable embodiment, the catch member 51 may be constructed from spring steel effective to rest in a first engagement position until the release member 50 is worked as described above.

Suitably, the ejection member 52 is operationally configured to generate a first force for biasing the firearm 25 toward the opening 30 according to Directional Arrow D (see FIG. 33). In order to conceal a firearm 25 within the outer case 15, a second force greater than the first force (see Directional Arrow E at FIG. 34) must be applied to the firearm 25 in order to direct the ejection member 52, and firearm 25, to a load position as shown in FIG. 33. In operation, the ejection member 52 rests in a load position until the ejection assembly is activated by applying an inward force to the release member 50. When the distal end 55 of the catch member 51 is disengaged from the catch surface 231, the first force generated by the ejection member 52 directs the firearm 25 toward the opening 30 thereby exposing at least part of the firearm 25 in a non-concealed position as shown in FIG. 34.

As shown in FIGS. 33 and 34, one suitable ejection member 52 may include a biasing member 57 and a face member 58 covering the biasing member 57 for receiving the firearm 25 in abutment thereto. Without limiting the invention, a suitable biasing member 57 may include, but is not necessarily limited to a compression spring or one or more resilient polymeric materials. One suitable biasing member 57 may include a steel compression spring. A suitable face member 58 may be constructed from one or more materials suitable for non-destructive abutment with the surface of the firearm 25. Suitable materials of construction may include, but are not necessarily limited to polymeric materials, textiles, and combinations thereof. The face member 58 may also include a particular abutment surface 59 operationally configured to optimize the surface area of abutment with the corresponding firearm 25. As shown, the abutment surface 59 may be defined by a planar surface having an angle for abutment corresponding to the outer surface of the trigger guard 203.

In one mode of operation, the first force (Directional Arrow D) generated by the ejection member 52 may not be great enough to completely eject the firearm 25 out from the outer case 15 when the ejection assembly is activated by applying an inward force to the release member 50. As such, a desired first force may be determined according to the weight of the firearm 25, the maximum length of the ejection member 52 and frictional forces between the firearm 25 and the inner surface of the outer case 15.

In still another embodiment, the system 10 may further include as part of an ejection system (1) a firearm stop system or firearm ejection safeguard system disposed along a firearm 25 and (2) a housing stop member disposed along the inner surface of the outer case 15 cooperatively providing additional working elements effective for capturing and holding a firearm 25 in a fixed non-concealed position as the ejection member 52 directs the corresponding firearm 25 out through the opening 30. In other words, the additional working elements are operationally configured to capture and hold a firearm 25 in a non-concealed position with a desired portion of the firearm 25 exposed out from the outer case 15 as desired, e.g., in a manner effective for the firearm 25 to be grabbed by a person's hand and drawn out from the outer case 15 for use. In a simplified embodiment, a housing stop member is operationally configured to contact a firearm stop member during firearm 25 ejection in a manner effective to hold the firearm 25 in a non-concealed position. In one simplified embodiment, corresponding firearm stop and housing stop members may include raised members or raised surfaces extending out from each of the firearm 25 and outer case 15 operationally configured to contact the other during firearm 25 ejection out from the outer case 15.

Figure 39:
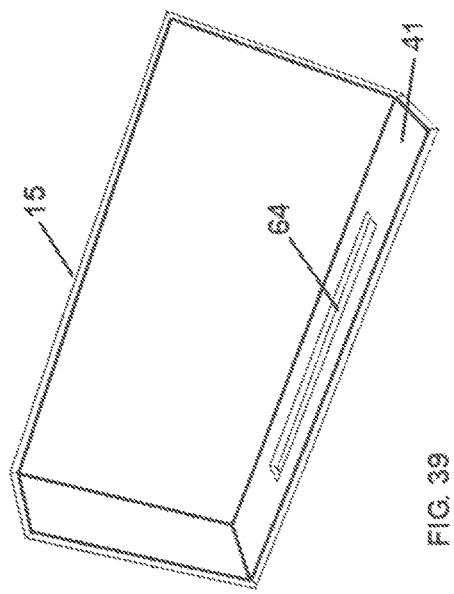
FIG. 39 is a perspective partial view of an embodiment of a housing including a channel disposed along the inner surface of the housing for cooperative operation with the biased catch assembly of FIG. 38.
Figure 38:
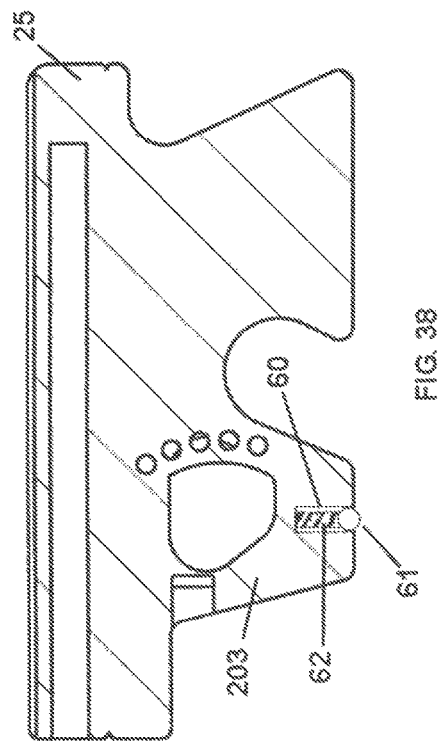
FIG. 38 is a sectional view of a firearm including an exemplary biased catch assembly of the firearm.
Figure 40:
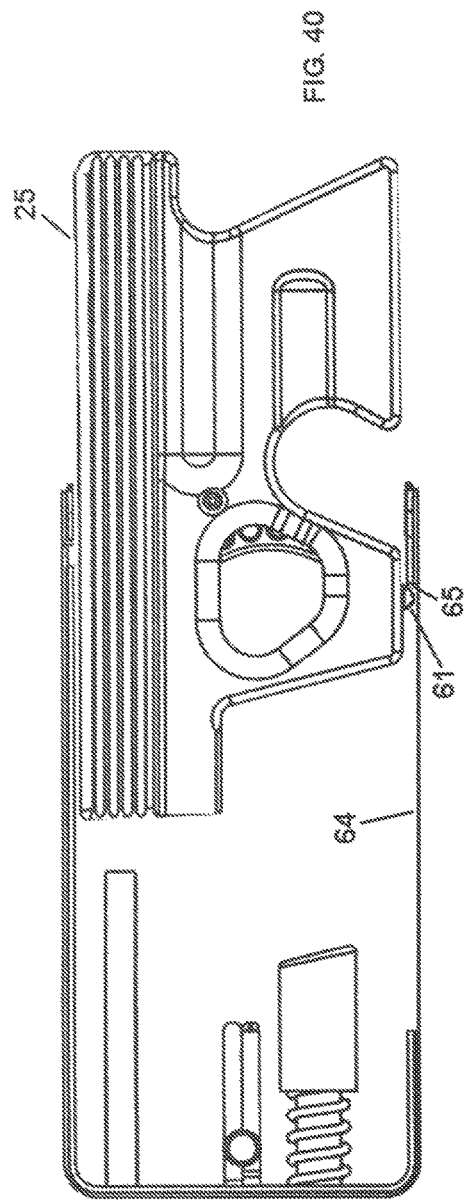
FIG. 40 is a side view including an exemplary firearm at a non-concealed position within a corresponding housing.

With attention to FIGS. 38-40, in one simplified embodiment a firearm stop member may include a biased catch assembly including a cavity 60 in the body of the trigger guard 203 with an opening along the bottom side of the trigger guard 203, i.e., along the bottom surface 221 of the firearm 25, for a biased ball member 61 or pin member to extend out through a desired distance. As understood by the skilled artisan, in order to retain the ball member 61 within the cavity 60 the opening of the cavity 60 includes a width less than the diameter of the ball member 61. Likewise, a pin member may be too large to escape out through the opening of the cavity 60 or the pin member may include a raised collar or the like to maintain the pin member within the cavity 60. As such, the ball member 61 or pin member and the opening of the cavity 61 may be designed to provide for a known amount of the ball member 61, or pin member, to extend out of the cavity 60 (hereafter referred to as a "catch region" of the ball member 61 or pin member). Similar to known biased ball type catches and locks, the catch region is suitably biased out from the cavity 60 via a third force generated by one or more biasing members 62. Without limiting the invention, a suitable biasing member 62 may include, but is not necessarily limited to compression springs, spring loaded plungers, resilient polymeric materials, and combinations thereof. One particular exemplary biasing member 62 may include a steel compression spring.

With particular reference to FIGS. 39 and 40, one suitable housing stop member may include a channel 64 or track or similar configuration disposed linearly along the inner surface of a side wall 41 that is operationally configured to receive the catch region of the ball member 61 therein, the channel 64 having an end wall 65 operationally configured to obstruct the ball member 61 or pin member in a manner effective to stop movement of the firearm 25 when it is directionally biased by the first force generated by the ejection member 52. As such, the configuration of the channel 64, the ball member 61 or pin member, as well as the third force generated by the biasing member 62 and exerted onto the ball member 61 or pin member, are cooperatively operationally configured to halt linear movement of the directionally biased firearm 25, while also cooperatively allowing a user to remove the firearm 25 from the outer case 15 by exerting a manual pulling force to the firearm 25. As understood by the skilled artisan, a pulling force suitably forces the ball member 61 or pin member directionally into the cavity 60 when the ball member 61 is pressed against a first end wall 65 due to the pulling force. Likewise, when inserting the firearm 25 into the outer case 15, the ball member 61 or pin member is located within the cavity 60 until the opening of the cavity 60 is directed along the channel 64 allowing the catch region of the ball member 61 or pin member to move out from the cavity 60 into an engagement position with the channel 64.

Figure 56:
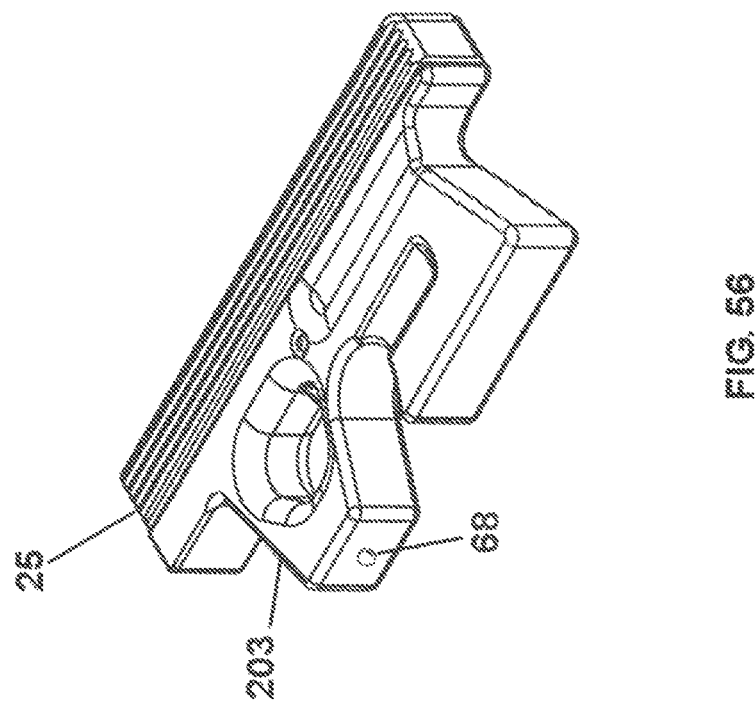
FIG. 56 is a perspective view of the firearm of FIG. 55.
Figure 55:
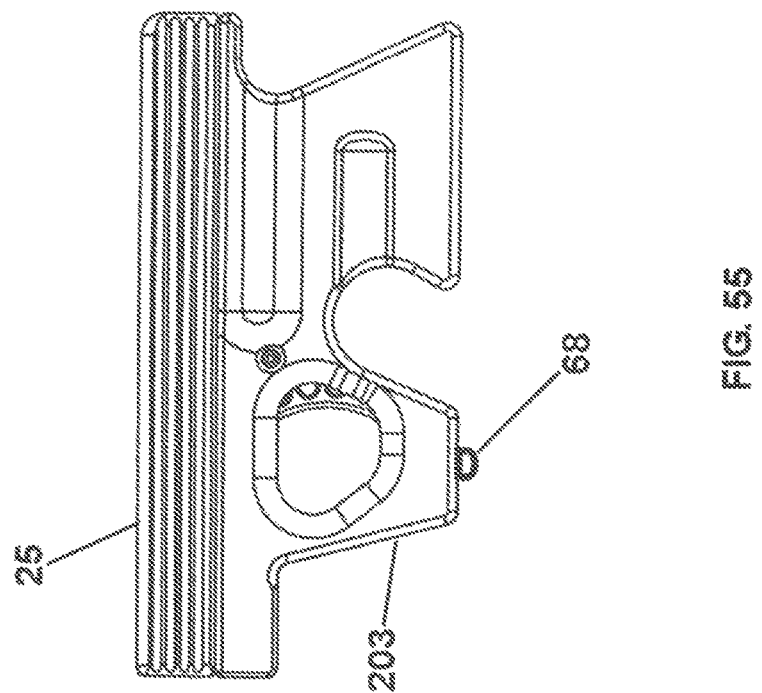
FIG. 55 is a side view of an embodiment of a firearm of this application.

As shown in the simplified example of FIGS. 55 and 56, in another embodiment the firearm stop member may include a static raised surface 68 or a malleable raised surface 68 depending on the material(s) of construction, e.g., metal(s), plastic(s), rubber(s), and combinations thereof, that is disposed along the bottom side of the trigger guard 203 instead of a biased catch assembly as described above. In this embodiment, the raised surface 68 suitably extends out a distance effective to cooperatively work with the channel 64 as described above. For efficient insertion and removal of the firearm 25 in and out of the outer case 15, the inner surface configuration of the outer case 15 provides sufficient space allowing a user to raise the firearm 25 within the outer case 15 a distance sufficient to provide clearance for the raised surface 68 to remove the firearm 25 from the outer case 15 by adjusting the position of the firearm 25 when exerting a pulling force to the firearm 25 and when manually applying a pushing force to the firearm 25 during insertion of the firearm 25 into the outer case 15. In one embodiment, the raised surface 68 may be provided as a separate member attachable to the firearm 25, e.g., via a threaded attachment, snap-fit, adhesive, and combinations thereof. In another embodiment, the raise surface 68 may be provided as part of the firearm 25 original one-piece construction.

The length of the channel 64 may vary as desired. For example, the channel 64 may include a length effective for the ball member 61, or pin member, to track within the channel 64 the distance of the channel 64 until the firearm 25 is set to a load position as shown in FIG. 33. It is further contemplated that in an embodiment having a channel 64 of a lesser length, as a firearm 25 is inserted into an outer case 15 via a second force, such force is sufficient to overcome the third force generated by the biasing member 62 at the opposing end wall of the channel 64 for directing a firearm 25 at a load position as shown in FIG. 33. In still another embodiment, a housing stop member may include a static raised surface or malleable raised surface as described above instead of or in addition to the channel 64 effective for contacting a firearm stop member.

Figure 41:
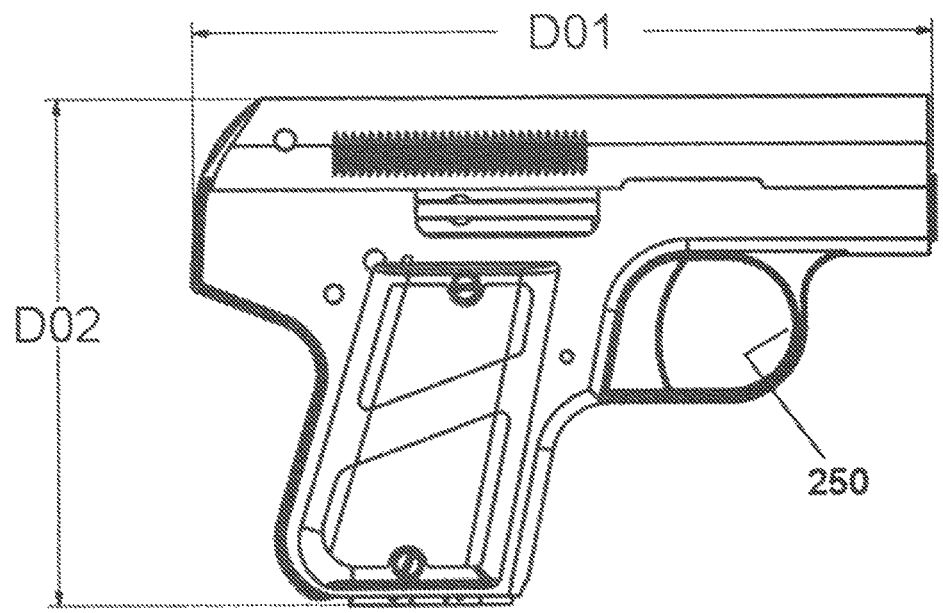
FIG. 41 is a side view of an exemplary commercially available firearm of a system of the present application.
Figure 42:
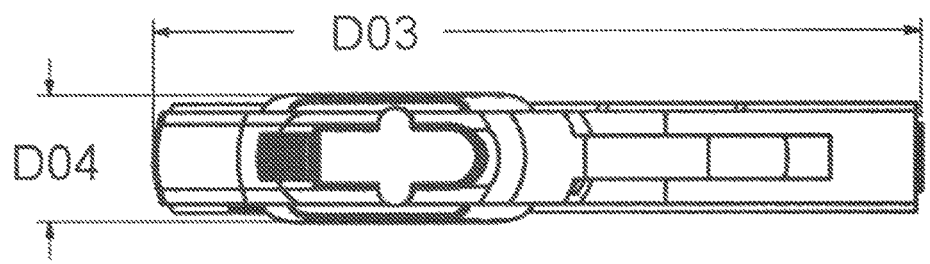
FIG. 42 is a bottom view of the firearm of FIG. 41.

In one particular Custom Model embodiment of the system 10, an outer case 15 may be operationally configured for concealing a standard compact auto-loading pistol, including, but not necessarily limited to commercially available pistols from (1) Smith & Wesson® (Model: SHIELD™) and (2) Beretta® (Model: NANO®). In another embodiment, an outer case 15 may be operationally configured for concealing a pocket pistol such as a "Derringer" as the term is understood by persons of ordinary skill in the art. In yet another Custom Model, the system 10 may include an outer case 15 operationally configured for use concealing a Bayard 1908 pistol as the term is understood by persons of ordinary skill in the art of firearms. With attention of FIGS. 41-42, the dimensions of a Bayard 1908 firearm 25 are provided below in Table 1:

TABLE 1

| | |
|---|---|
| D01: | about 125.369 mm (about 4.94 inches); |
| D02: | about 85.902 mm (about 3.38 inches); |
| D03: | about 125.759 mm (about 4.95 inches); |
| D04: | about 20.809 mm (about 0.82 inches). |

The outer case 15 of a Custom Model may operate substantially similar as the outer case 15 of an Original Model. For example, the raised distal end 55 of the catch member 51 is suitably operationally configured to grab or otherwise engage the inner surface 250 of the trigger guard (see FIG. 41). Similar as the Original Model, a Custom Model may slide freely within an outer case 15 or the outer case 15 may be provided with a channel 64 and an adaptor including a biased ball member 61, pin member, or the like, that may be added to the grip 202 as desired. For purposes of improving linear movement of the firearm 25 of a Custom Model within an outer case 15, one or more surface features that may otherwise snag or hang-up along the inner surface 40 of the outer case 15 during ejection of the firearm 25 such as the front and/or rear iron sights, magazine release and/or safety mechanism may be removed from the firearm 25 as desired or as otherwise required for desired operation. Removal of such features from the firearm 25 may also decrease the overall size of the corresponding outer case 15.

In another embodiment of a Custom Model, instead of using a catch member 51 as described above, a single piston spring that exerts pressure between the outer case 15 and the front of a firearm 25 may be provided along the inner surface of the closed first end 29 that is operationally configured to penetrate the barrel 201 of the firearm 25 and is large enough to fill the barrel 201 and provide axial support to keep the firearm 25 from hanging up when being deployed out from the outer case 15 via the ejection member 52. In such embodiment, the piston spring suitably provides a sufficiently tight fit within the barrel 201 such that when the firearm 25 is directed toward the opening 30 during ejection of the firearm 25, the friction between the piston spring and the inner surface of the barrel 201 is effective to keep the firearm 25 from ejecting completely out from the outer case 15, i.e., to keep the firearm 25 from ejecting out completely from outer case 15 whereby the firearm 25 may be subject to falling toward the ground or floor away from a user's grasp. In one embodiment, the piston spring may include friction causing brass bristle type members. In another embodiment, the piston spring may include a ballistic nylon covering a rubber encased spring. In addition, a biased catch system effective to hold a firearm 25 in a fixed concealed position within an outer case 15 may include a dual catch member 51 assembly effective to engage the front of a trigger guard 203 from opposing sides of the trigger guard 203, thereby holding the firearm 25 in a load position until the release member 50 is activated. In this embodiment, as with the Original Model embodiment also, dual opposing release members may be provided on opposite sides of the outer case 15 for communicating with dual catch members.

The configuration of the release member 50 may be provided as desired, e.g., a push button design as described above. In another embodiment, the release member 50 may include a push tab design. In another embodiment, the release member 50 may include a lever assembly. In another embodiment, the release member 50 may include a pull release assembly. In still another embodiment, the biased catch system may be remotely triggered via wireless electronic communication in communication with electrical and mechanical component parts of the outer case 15. In another embodiment, a security fingerprint identification system may be employed for purposes of directing a firearm 25 from a concealed to a non-concealed position. One suitable type of fingerprint identification may include a fingerprint identity sensor as disclosed in U.S. Pat. No. 9,158,957, which is herein incorporated by reference in its entirety. Another suitable fingerprint identification system may utilize a technological approach as disclosed in U.S. Pat. No. 6,320,975, which is herein incorporated by reference in its entirety.

Figure 43:
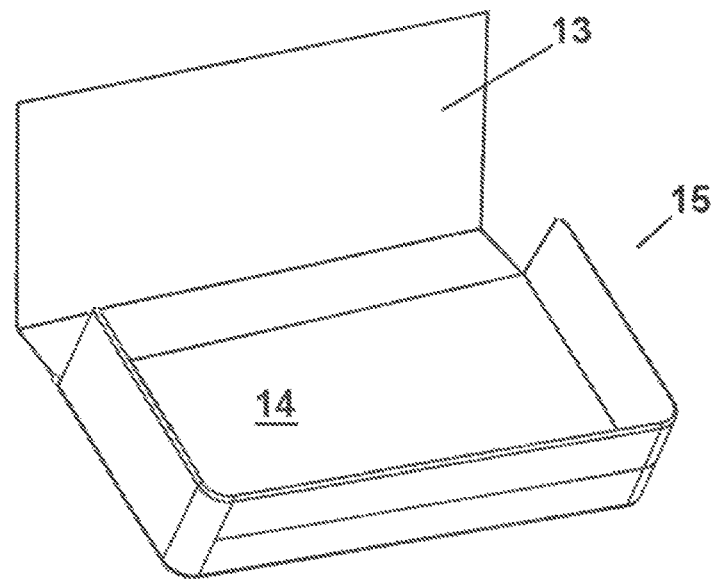
FIG. 43 is a perspective view of another embodiment of a housing in an open position.
Figure 44:
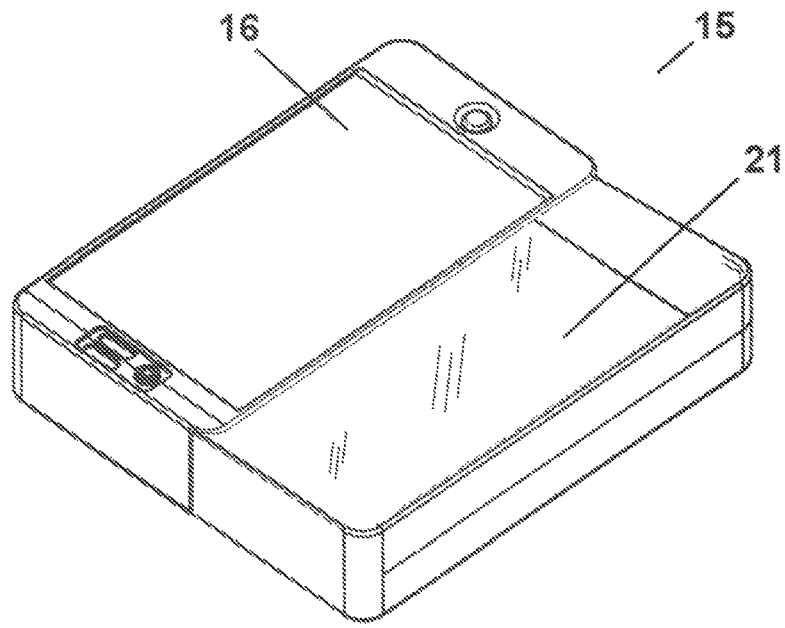
FIG. 44 is a perspective view of another embodiment of a housing in a partially open position.
Figure 45:
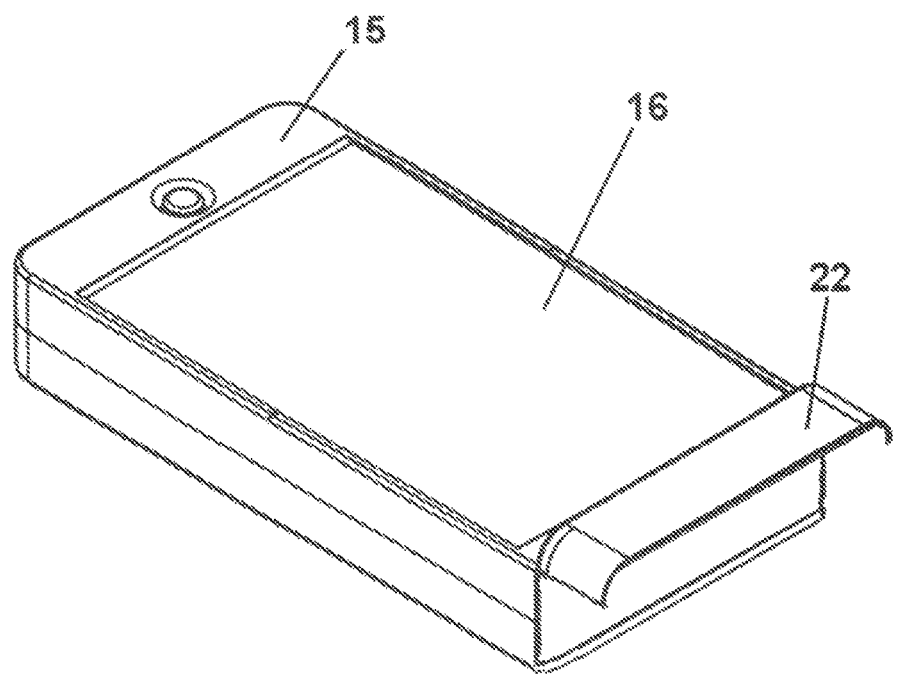
FIG. 45 is a perspective view of another embodiment of a housing in an open position.
Figure 46:
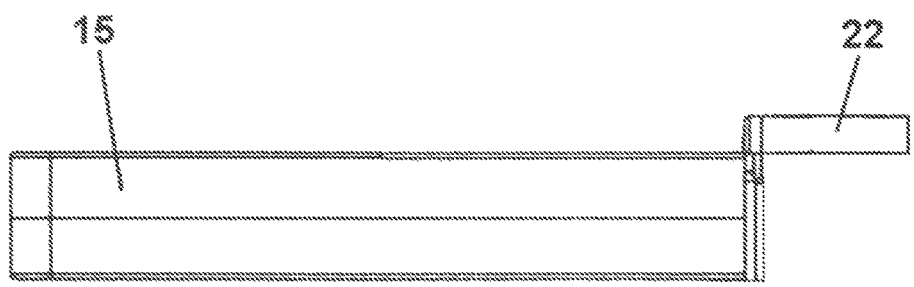
FIG. 46 is a side view of the housing of FIG. 45.

In still another embodiment as illustrated in FIG. 43, the system 10 may include an outer case 15 having a front side 13 operationally configured to open in a manner effective to expose a firearm 25 stored therein. In this embodiment, the outer case 15 may include creases allowing the front side 13 to open and close. In another embodiment, the front side 13 may be hingedly attached to the back side 14. In still another embodiment as illustrated in FIG. 44, the system 10 may include a sliding drawer style compartment 21 for concealing and removing a firearm 25. In still another embodiment, the outer case 15 may include a single flap type member 22 hingedly attached to the outer case 15 for covering the opening 30 (see FIGS. 45-46). In this embodiment, the single flap type member 22 may be biased to a closed position over the opening 30 via one or more biasing members, e.g., a bias spring.

Without limiting the outer case 15, flap members 31, 32 and/or single flap type member 22 to any particular materials of construction, suitable materials of construction include, but are not necessarily limited to those materials resistant to chipping, cracking, excessive bending and reshaping as a result of ozone, weathering, heat, moisture, other outside mechanical and chemical influences, physical impacts, and combinations thereof. In particular, such may be constructed from materials including but not necessarily limited to metals, polymeric materials, fiberglass, plexiglass, filled composite materials, wood, compressed paper, and combinations thereof. Likewise, the outer case 15, flap members 31, 32 and/or single flap type member 22 may comprise any color or combination of colors, as desired. In one particular embodiment, the outer case 15, the flap members 31, 32 and/or single flap type member 22 may be constructed from a plastic such as a thermoplastic including, but not necessarily limited to a polycarbonate material. In another embodiment, the outer case 15, the flap members 31, 32 and/or single flap type member 22 may be constructed from stainless steel. In another embodiment, the outer case 15, the flap members 31, 32 and/or single flap type member 22 may be constructed from aluminum and/or pressed aluminum. In addition, the outer case 15 may include a transparent material camouflaging in a manner effective to be viewed as a touch screen 16. Suitable transparent materials may include plastics, glass, acrylic glass, and combinations thereof. In one embodiment, a transparent material may cover a dark colored area of an outer case 15 to mimic the appearance of a touch screen 16 in an OFF position. In another embodiment, a dark colored plastic, glass material, and/or acrylic glass material may be provided to mimic a touch screen 16 in an OFF position. In addition, the inner surface of an outer case 15 may include one or more anti-friction films or coatings as desired, e.g., a coating comprising polytetrafluoroethylene (PTFE). In one embodiment, the outer case 15 may be assembled from various individual component parts. In another embodiment, the outer case 15 may be manufactured via injection molding. In another embodiment, the outer case 15 may be manufactured via 3D printing as understood by the skilled artisan.

Suitably, a firearm 25 as provided as part of an Original Model system 10 may be constructed from like materials as commercially available firearms. As understood by the skilled artisan, firearm 25 materials of construction may include, but are not necessarily limited to steel, aluminum, polymeric materials, and combinations thereof. It is also contemplated that 3D printing may be employed to manufacture plastic and metal firearms 25. A firearm 25 of this application may also be provided with various features such as plastic and/or rubber grips to be added to the grip 202.

The invention will be better understood with reference to the following non-limiting examples, which are illustrative only and not intended to limit the present invention to a particular embodiment.

EXAMPLE 1

In a first non-limiting embodiment of the system 10 as shown in FIGS. 47-52, an outer case 15 and corresponding firearm 25 may be provided according to the following dimensional ranges:

D1: about 10.2 cm to about 17.8 cm (about 4.0 inches to about 7.0 inches);
D2: about 1.7 cm to about 3.2 cm (about 0.65 inches to about 1.25 inches);
D3: about 6.4 cm to about 8.9 cm (about 2.5 inches to about 3.5 inches);
D4: about 9.9 cm to about 17.5 cm (about 3.9 inches to about 6.9 inches);
D5: about 1.5 cm to about 3.1 cm (about 0.60 inches to about 1.20 inches);
D6: about 6.1 cm to about 8.6 cm (about 2.4 inches to about 3.4 inches).

EXAMPLE 2

Figure 53:
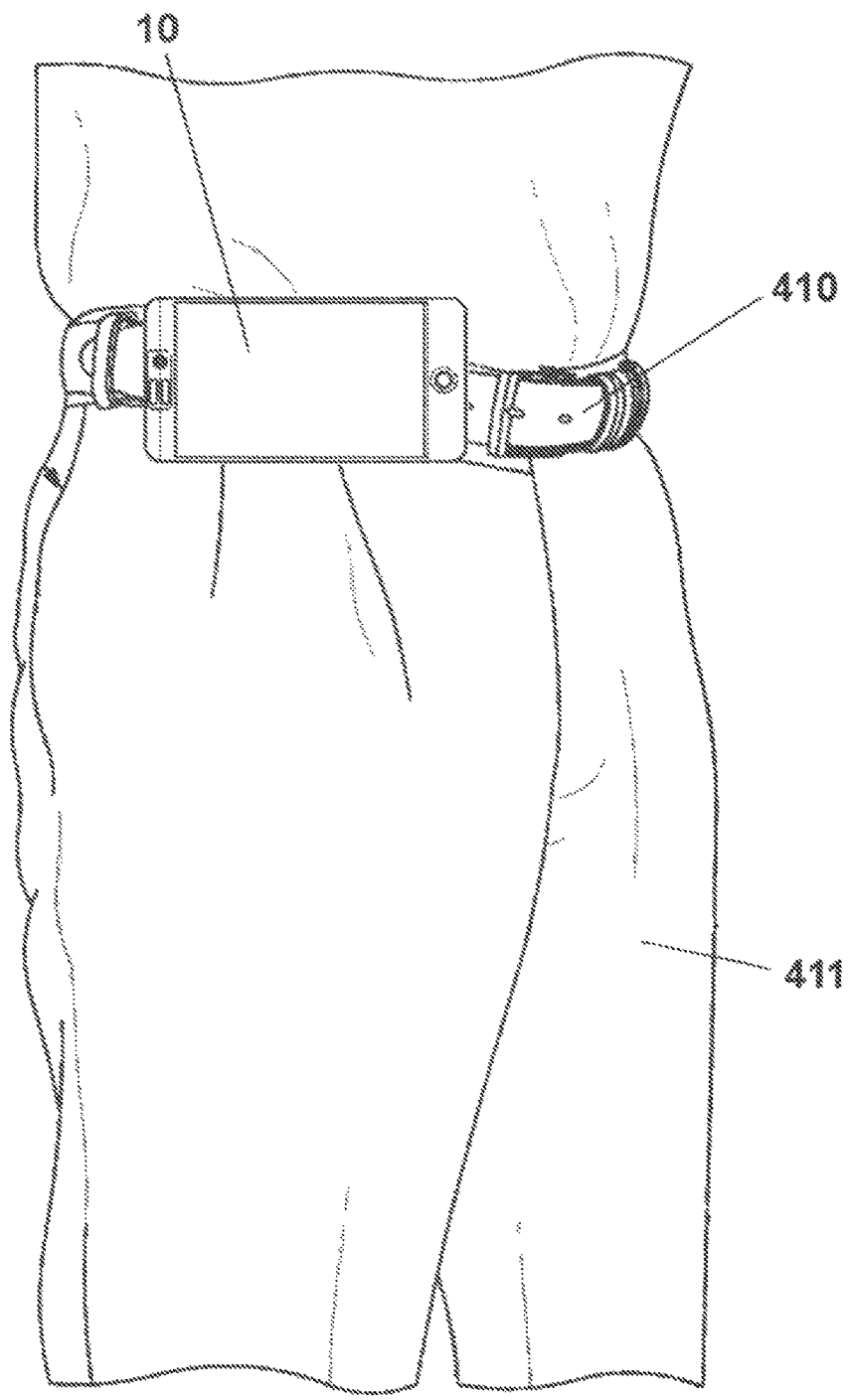
FIG. 53 illustrates a system attached to a user's waist including a firearm in a concealed position.
Figure 54:
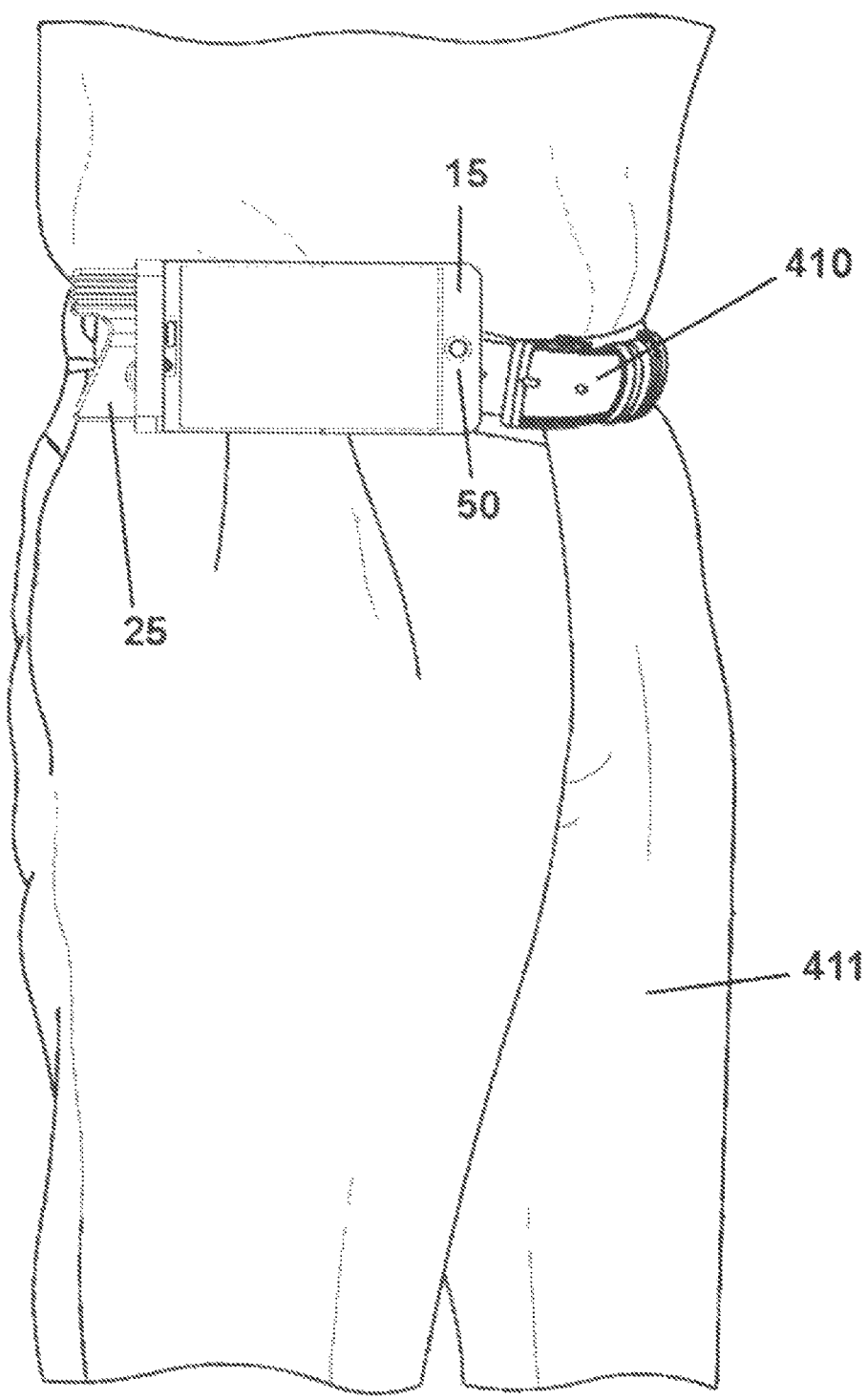
FIG. 54 is a view of the system of FIG. 53 with the firearm in a non-concealed position.

In a second non-limiting embodiment, a system 10 including an outer case 15 and firearm 25 for right handed use as shown in FIG. 40 is provided. The system 10 further includes a holster secured to the back of the outer case 15, the holster having a clip for attaching to the belt 410 around the waist of a user 411 as shown in FIGS. 53 and 54. In operation, a user 411 places the firearm 25 inside the outer case 15 in a concealed loaded position either before or after attaching the outer case 15 to his/her belt 410 along the right side of his/her waist. When access to the firearm 25 is desired, the user 411 activates the ejection assembly of the outer case 15 by pressing inward on the release member 50, which directs the firearm 25 to a non-concealed position as shown in FIG. 54. Once the firearm 25 is in a non-concealed position, the user 411 may grab the firearm with his/her hand for operation of the firearm 25.

Although particular embodiments of the present invention have been described above in detail, it will be understood that this description is merely for purposes of illustration.

Specific features of the invention are shown in some drawings and not in others, and this is for convenience only and any feature may be combined with another in accordance with the invention. Also, elements or steps from one embodiment can be readily recombined with one or more elements or steps from other embodiments. Further, one skilled in the art will appreciate further features and advantages of the invention based on the above-described embodiments. Accordingly, the invention is not to be limited by what has been particularly shown and described, except as indicated by the appended claims. Finally, all publications and references cited herein are expressly incorporated herein by reference in their entirety.

I claim:

1. A concealed carry firearm system for a user including a firearm and housing cooperatively operationally configured to hold the firearm in a fully concealed position within the housing and to direct the firearm to a non-concealed position via user control, wherein the housing includes a closed end including an ejection assembly defined by a catch member, a release member attached to the catch member and a biased ejection member and an opposing open end including a dual flap cover assembly moveable between an open position defining a non-concealed position of the firearm and a closed position defining a concealed position of the firearm, wherein (1) the firearm includes a surface operationally configured to receive at least part of the catch member in an engagement position with said surface effective to prevent movement of the firearm toward the open end when the firearm is set at the concealed position, (2) the non-concealed position includes at least part of the firearm being located out beyond the dual flap cover assembly, (3) the biased ejection member is operationally configured to bias the firearm to the non-concealed position when the catch member is not in the engagement position with said surface of the firearm and (4) the firearm is separable from the housing via the open end for use of the firearm.

2. The system of claim 1 wherein the release member is operationally configured to disengage the catch member from the surface of the firearm.

3. The system of claim 1 wherein the firearm includes a trigger guard with a surface operationally configured to receive at least part of the catch member in said engagement position.

4. The system of claim 1 wherein the housing has an outer surface appearance of a mobile electronic device.

Figure 9:
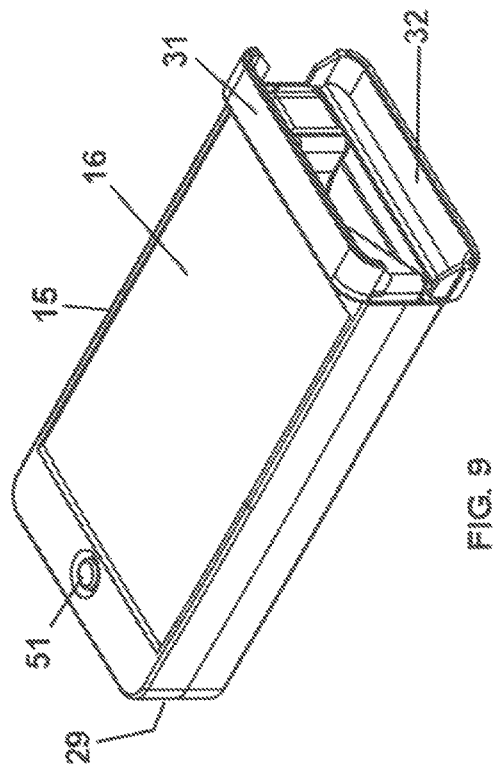
FIG. 9 is a perspective view of the housing of FIG. 8 including a firearm housed therein.
Figure 11:
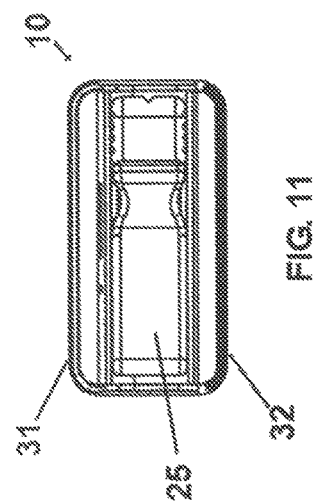
FIG. 11 is a view of a second end of the housing of FIG. 8 including a firearm housed therein.
Figure 8:
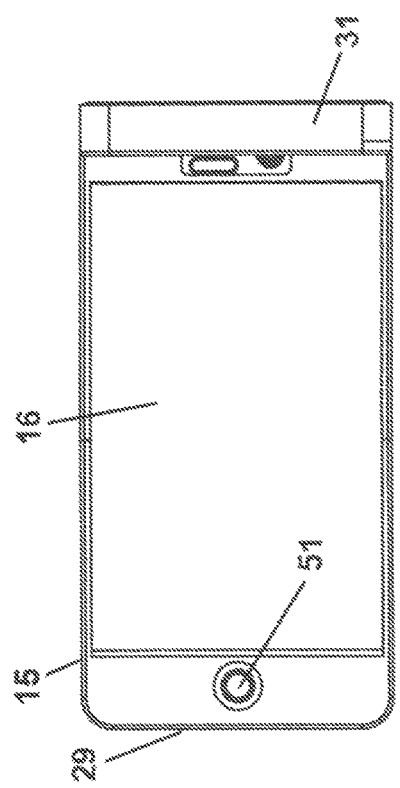
FIG. 8 is a front view of an exemplary housing with opposing flap members in an open position.
Figure 10:
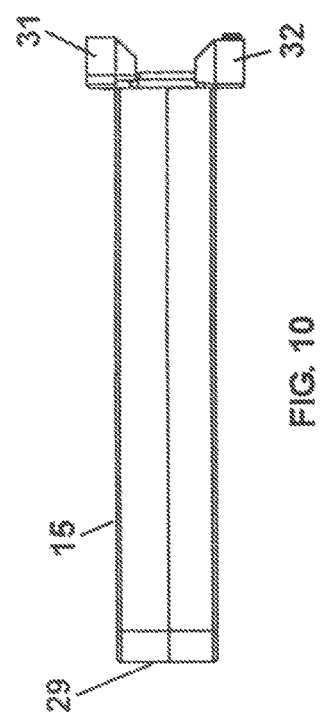
FIG. 10 is an elevational side view of the housing of FIG. 8.

5. The system of claim 1 wherein the housing has an outer surface appearance of a smart phone and protective case combination as shown in FIG. 9.

* * * * *